US012647609B2

(12) United States Patent　　(10) Patent No.:　US 12,647,609 B2
　Ruiz Coll et al.　　　　　　　(45) Date of Patent:　Jun. 2, 2026

---

(54) INTRA PREDICTION SIGNALING

(71) Applicant: Ofinno, LLC, Reston, VA (US)

(72) Inventors: Damian Ruiz Coll, Reston, VA (US);
Young-Yoon Lee, McLean, VA (US);
Esmael Hejazi Dinan, McLean, VA
(US); Kalyan Goswami, Reston, VA
(US); Tae Meon Bae, McLean, VA
(US)

(73) Assignee: Ofinno, LLC, Reston, VA (US)

( * ) Notice: Subject to any disclaimer, the term of this
patent is extended or adjusted under 35
U.S.C. 154(b) by 0 days.

(21) Appl. No.: 17/571,797

(22) Filed: Jan. 10, 2022

(65) Prior Publication Data

US 2022/0224938 A1　　Jul. 14, 2022

Related U.S. Application Data

(60) Provisional application No. 63/135,146, filed on Jan.
8, 2021.

(51) Int. Cl.
*H04N 19/593*　　(2014.01)
*H04N 19/105*　　(2014.01)
*H04N 19/11*　　(2014.01)
*H04N 19/132*　　(2014.01)
*H04N 19/176*　　(2014.01)
*H04N 19/70*　　(2014.01)

(52) U.S. Cl.
CPC ......... *H04N 19/593* (2014.11); *H04N 19/105*
(2014.11); *H04N 19/11* (2014.11); *H04N
19/132* (2014.11); *H04N 19/176* (2014.11);
*H04N 19/70* (2014.11)

(58) Field of Classification Search
CPC .... H04N 19/593; H04N 19/105; H04N 19/11;
H04N 19/132; H04N 19/176; H04N
19/70
See application file for complete search history.

(56) References Cited

U.S. PATENT DOCUMENTS

| 9,584,827 B2 | 2/2017 | Oh et al. |
| 10,015,515 B2 | 7/2018 | Guo et al. |
| 10,257,538 B2 | 4/2019 | Piao et al. |

(Continued)

FOREIGN PATENT DOCUMENTS

| CA | 2888490 C | 2/2011 |
| EP | 3058736 B1 | 2/2019 |

OTHER PUBLICATIONS

Nasrallah et al.; Decoder-side intra mode derivation based on a
histogram of gradients in Versatile Video Coding; 2019 Data
Compression Conference (DCC); 2019.
Yoon et al.; Most frequent mode for intra-mode coding in video
coding; Electronics Letters; Feb. 21, 2019; vol. 55; No. 4; pp.
188-190; Feb. 2019.

(Continued)

*Primary Examiner* — Francis Geroleo

(74) *Attorney, Agent, or Firm* — Willis H. Chang; Kavon
Nasabzadeh; Jacob L. Mangan

(57) ABSTRACT

A decoder may receive, from a bitstream for a block, a
residual block of samples, a first component, and a second
component. The decoder may determine reference samples
for intra prediction of the block. The decoder may generate
a prediction of the block from the reference samples based
on a ratio of the first component to the second component.
The ratio determines a prediction angle. The decoder may
generate a decoded block from the prediction of the block
and the residual block.

20 Claims, 24 Drawing Sheets

(56) References Cited

U.S. PATENT DOCUMENTS

| | | | |
|---|---|---|---|
| 10,264,280 B2 | 4/2019 | Chien et al. | |
| 10,785,487 B2 | 9/2020 | Jeon et al. | |
| 2020/0112728 A1 | 4/2020 | Ramasubramonian et al. | |
| 2020/0112735 A1 | 4/2020 | Xu et al. | |
| 2020/0169729 A1 | 5/2020 | Xu et al. | |
| 2020/0304784 A1 | 9/2020 | Kotra et al. | |
| 2020/0322601 A1* | 10/2020 | Ko | H04N 19/132 |
| 2020/0374517 A1* | 11/2020 | Liu | H04N 19/184 |
| 2021/0127110 A1* | 4/2021 | Filippov | H04N 19/176 |
| 2021/0127122 A1* | 4/2021 | Filippov | H04N 19/176 |
| 2021/0152818 A1* | 5/2021 | Filippov | H04N 19/146 |
| 2021/0250577 A1* | 8/2021 | Leleannec | H04N 19/147 |
| 2022/0014741 A1* | 1/2022 | Xiu | H04N 19/46 |
| 2022/0109872 A1* | 4/2022 | Yoo | H04N 19/593 |

OTHER PUBLICATIONS

Xu et al.; Recent advances in video coding beyond the HEVC standard; Published online by Cambridge University Press; Jun. 25, 2019.

Li et al.; Unified Intra Mode Coding Based on Short and Long Range Correlations; IIEEE Transactions on Image Processing ( vol. 29); Jun. 11, 2020; pp. 7245-7260; IEEE.

Zhao et al.; Wide Angular Intra Prediction for Versatile Video Coding; 2019 Data Compression Conference (DCC); Mar. 26-29, 2019; IEEE; Snowbird, UT, USA.

Document: JVET-T2001-v2; Joint Video Experts Team (JVET) of ITU-T SG 16 WP 3 and ISO/IEC JTC 1/SC 29; 20th Meeting, by teleconference, Oct. 7-16, 2020; Title: Versatile Video Coding Editorial Refinements on Draft 10; Status: Output document approved by JVET; Purpose: Draft text of video coding specification.

* cited by examiner

*400*

*500*

Horizontal Ternary Tree
Partition
*608*

Vertical Ternary Tree
Partition
*606*

Horizontal Binary Tree
Partition
*604*

Vertical Binary Tree
Partition
*602*

0: Planar
1: DC

0: Planar
1: DC

Figure 24:
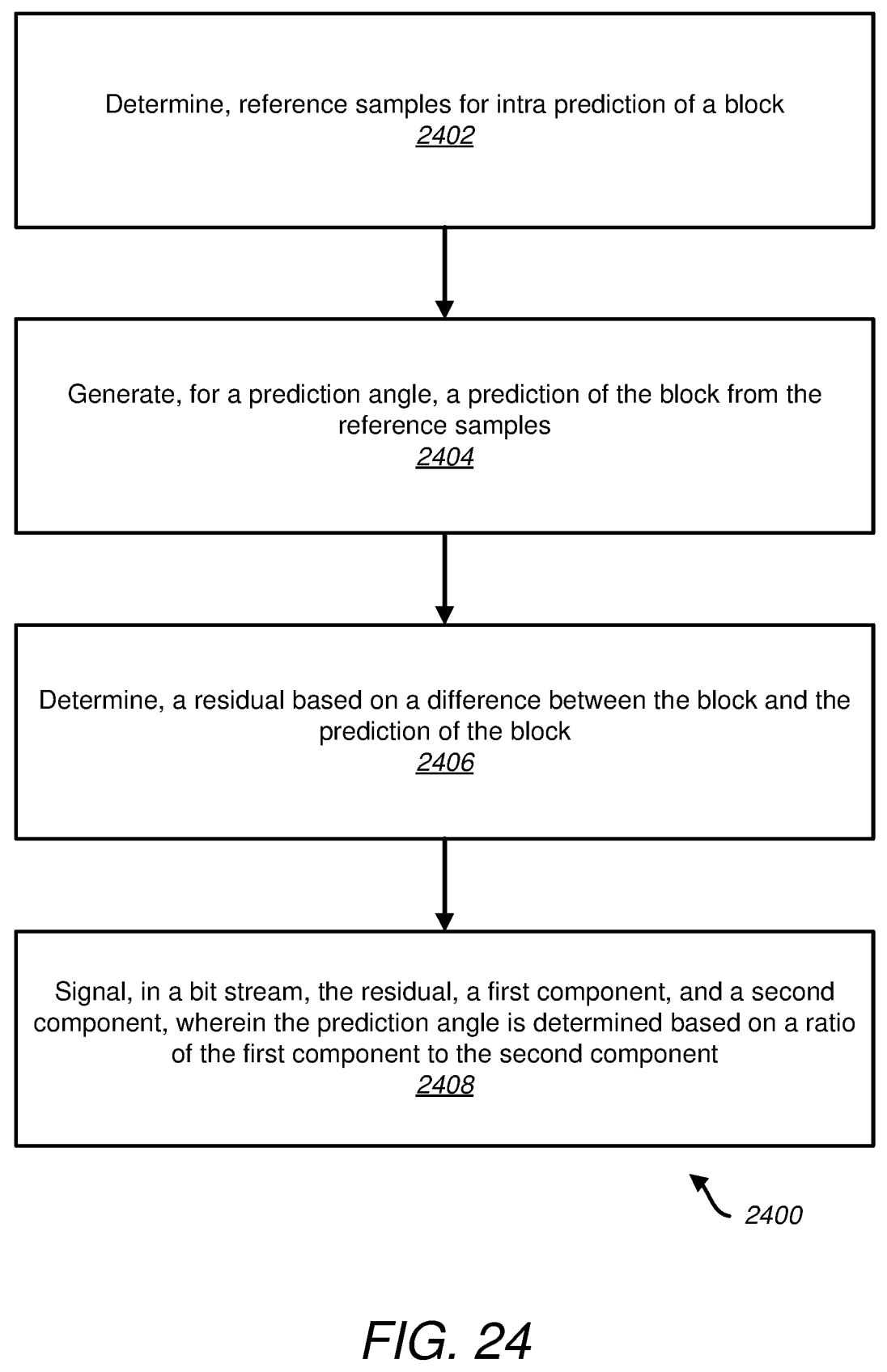

Determine, reference samples for intra prediction of a block
*2402*

Generate, for a prediction angle, a prediction of the block from the reference samples
*2404*

Determine, a residual based on a difference between the block and the prediction of the block
*2406*

Signal, in a bit stream, the residual, a first component, and a second component, wherein the prediction angle is determined based on a ratio of the first component to the second component
*2408*

Receiving, , from a bitstream, a residual block of samples, a first component, and a second component
*2502*

Determining, a prediction angle based on the first component and a second component
*2504*

Determining, reference samples for intra prediction of a block
*2506*

Generate, a prediction block of the block from the reference samples based on the prediction angle
*2508*

Generate, a decoded block from the prediction block and a residual block
*2510*

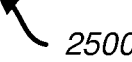 *2500*

*FIG. 25*

INTRA PREDICTION SIGNALING

CROSS-REFERENCE TO RELATED APPLICATIONS

This application claims the benefit of U.S. Provisional Application No. 63/135,146, filed Jan. 8, 2021, which is hereby incorporated by reference in its entirety.

BRIEF DESCRIPTION OF THE DRAWINGS

Examples of several of the various embodiments of the present disclosure are described herein with reference to the drawings.

FIG. 24 illustrates a flowchart of a method for signaling an intra prediction angle for a block in accordance with embodiments of the present disclosure.

FIG. 25 illustrates a flowchart of a method for decoding an intra prediction angle for a block in accordance with embodiments of the present disclosure.

DETAILED DESCRIPTION

Figure 1:
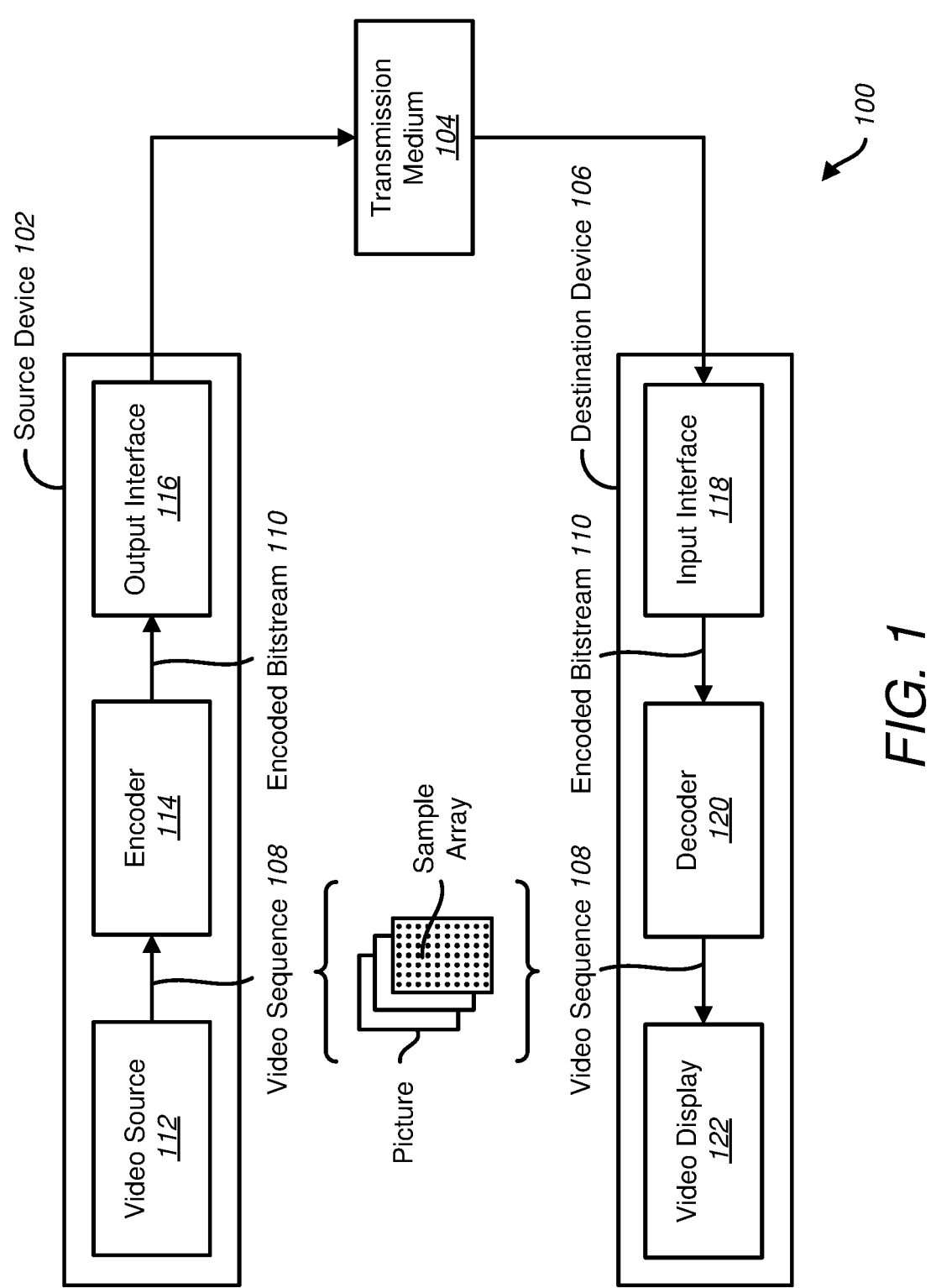
FIG. 1 illustrates an exemplary video coding/decoding system in which embodiments of the present disclosure may be implemented.

In the following description, numerous specific details are set forth in order to provide a thorough understanding of the disclosure. However, it will be apparent to those skilled in the art that the disclosure, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable medium. A processor(s) may perform the necessary tasks.

Representing a video sequence in digital form may require a large number of bits. The data size of a video sequence in digital form may be too large for storage and/or transmission in many applications. Video encoding may be used to compress the size of a video sequence to provide for more efficient storage and/or transmission. Video decoding may be used to decompress a compressed video sequence for display and/or other forms of consumption.

FIG. 1 illustrates an exemplary video coding/decoding system 100 in which embodiments of the present disclosure may be implemented. Video coding/decoding system 100 comprises a source device 102, a transmission medium 104, and a destination device 106. Source device 102 encodes a video sequence 108 into an encoded bitstream 110 for more efficient storage and/or transmission. Source device 102 may store and/or transmit encoded bitstream 110 to destination device 106 via transmission medium 104. Destination device 106 decodes encoded bitstream 110 to display video sequence 108. Destination device 106 may receive encoded bit stream 110 from source device 102 via transmission medium 104. Source device 102 and destination device 106 may be any one of a number of different devices, including a desktop computer, laptop computer, tablet computer, smart phone, wearable device, television, camera, video gaming console, set-top box, or video streaming device.

To encode video sequence 108 into encoded bitstream 110, source device 102 may comprise a video source 112, an encoder 114, and an output interface 116. Video source 112 may provide or generate video sequence 108 from a capture of a natural scene and/or a synthetically generated scene. A synthetically generated scene may be a scene comprising computer generated graphics or screen content. Video source 112 may comprise a video capture device (e.g., a video camera), a video archive comprising previously captured natural scenes and/or synthetically generated scenes, a video feed interface to receive captured natural scenes and/or synthetically generated scenes from a video content provider, and/or a processor to generate synthetic scenes.

A shown in FIG. 1, a video sequence, such as video sequence 108, may comprise a series of pictures (also referred to as frames). A video sequence may achieve the impression of motion when a constant or variable time is used to successively present pictures of the video sequence. A picture may comprise one or more sample arrays of intensity values. The intensity values may be taken at a series of regularly spaced locations within a picture. A color picture typically comprises a luminance sample array and two chrominance sample arrays. The luminance sample array may comprise intensity values representing the brightness (or luma component, Y) of a picture. The chrominance sample arrays may comprise intensity values that respectively represent the blue and red components of a picture (or chroma components, Cb and Cr) separate from the brightness. Other color picture sample arrays are possible based on different color schemes (e.g., an RGB color scheme). For color pictures, a pixel may refer to all three intensity values for a given location in the three sample arrays used to represent color pictures. A monochrome picture comprises a single, luminance sample array. For monochrome pictures, a pixel may refer to the intensity value at a given location in the single, luminance sample array used to represent monochrome pictures.

Encoder 114 may encode video sequence 108 into encoded bitstream 110. To encode video sequence 108, encoder 114 may apply one or more prediction techniques to reduce redundant information in video sequence 108. Redundant information is information that may be predicted at a decoder and therefore may not be needed to be transmitted to the decoder for accurate decoding of the video sequence. For example, encoder 114 may apply spatial prediction (e.g., intra-frame or intra prediction), temporal prediction (e.g., inter-frame prediction or inter prediction), inter-layer prediction, and/or other prediction techniques to reduce redundant information in video sequence 108. Before applying the one or more prediction techniques, encoder 114 may partition pictures of video sequence 108 into rectangular regions referred to as blocks. Encoder 114 may then encode a block using one or more of the prediction techniques.

For temporal prediction, encoder 114 may search for a block similar to the block being encoded in another picture (also referred to as a reference picture) of video sequence 108. The block determined during the search (also referred to as a prediction block) may then be used to predict the block being encoded. For spatial prediction, encoder 114 may form a prediction block based on data from reconstructed neighboring samples of the block to be encoded within the same picture of video sequence 108. A reconstructed sample refers to a sample that was encoded and then decoded. Encoder 114 may determine a prediction error (also referred to as a residual) based on the difference between a block being encoded and a prediction block. The prediction error may represent non-redundant information that may be transmitted to a decoder for accurate decoding of a video sequence.

Encoder 114 may apply a transform to the prediction error (e.g. a discrete cosine transform (DCT)) to generate transform coefficients. Encoder 114 may form encoded bitstream 110 based on the transform coefficients and other information used to determine prediction blocks (e.g., prediction types, motion vectors, and prediction modes). In some examples, encoder 114 may perform one or more of quantization and entropy coding of the transform coefficients and/or the other information used to determine prediction blocks before forming encoded bitstream 110 to further reduce the number of bits needed to store and/or transmit video sequence 108.

Output interface 116 may be configured to write and/or store encoded bitstream 110 onto transmission medium 104 for transmission to destination device 106. In addition or alternatively, output interface 116 may be configured to transmit, upload, and/or stream encoded bitstream 110 to destination device 106 via transmission medium 104. Output interface 116 may comprise a wired and/or wireless transmitter configured to transmit, upload, and/or stream encoded bitstream 110 according to one or more proprietary and/or standardized communication protocols, such as Digital Video Broadcasting (DVB) standards, Advanced Television Systems Committee (ATSC) standards, Integrated Services Digital Broadcasting (ISDB) standards, Data Over Cable Service Interface Specification (DOCSIS) standards, 3rd Generation Partnership Project (3GPP) standards, Institute of Electrical and Electronics Engineers (IEEE) standards, Internet Protocol (IP) standards, and Wireless Application Protocol (WAP) standards.

Transmission medium 104 may comprise a wireless, wired, and/or computer readable medium. For example, transmission medium 104 may comprise one or more wires, cables, air interfaces, optical discs, flash memory, and/or magnetic memory. In addition or alternatively, transmission medium 104 may comprise one more networks (e.g., the Internet) or file servers configured to store and/or transmit encoded video data.

To decode encoded bitstream 110 into video sequence 108 for display, destination device 106 may comprise an input interface 118, a decoder 120, and a video display 122. Input interface 118 may be configured to read encoded bitstream 110 stored on transmission medium 104 by source device 102. In addition or alternatively, input interface 118 may be configured to receive, download, and/or stream encoded bitstream 110 from source device 102 via transmission medium 104. Input interface 118 may comprise a wired and/or wireless receiver configured to receive, download, and/or stream encoded bitstream 110 according to one or more proprietary and/or standardized communication protocols, such as those mentioned above.

Decoder 120 may decode video sequence 108 from encoded bit stream 110. To decode video sequence 108, decoder 120 may generate prediction blocks for pictures of video sequence 108 in a similar manner as encoder 114 and determine prediction errors for the blocks. Decoder 120 may generate the prediction blocks using prediction types, prediction modes, and/or motion vectors received in encoded bit stream 110 and determine the prediction errors using transform coefficients also received in encoded bit stream 110. Decoder 120 may determine the prediction errors by weighting transform basis functions using the transform coefficients. Decoder 120 may combine the prediction blocks and prediction errors to decode video sequence 108.

In some examples, decoder 120 may decode a video sequence that approximates video sequence 108 due to, for example, lossy compression of video sequence 108 by encoder 114 and/or errors introduced into encoded bit stream 110 during transmission to destination device 106.

Video display 122 may display video sequence 108 to a user. Video display 122 may comprise a cathode rate tube (CRT) display, liquid crystal display (LCD), a plasma display, light emitting diode (LED) display, or any other display device suitable for displaying video sequence 108.

It should be noted that video encoding/decoding system 100 is presented by way of example and not limitation. In the example of FIG. 1, video encoding/decoding system 100 may have other components and/or arrangements. For example, video source 112 may be external to source device 102. Similarly, video display device 122 may be external to destination device 106 or omitted altogether where video sequence is intended for consumption by a machine and/or storage device. In another example, source device 102 may further comprise a video decoder and destination device 104 may comprise a video encoder. In such an example, source device 102 may be configured to further receive an encoded bit stream from destination device 106 to support two-way video transmission between the devices.

In the example of FIG. 1, encoder 114 and decoder 120 may operate according to any one of a number of proprietary or industry video coding standards. For example, encoder 114 and decoder 120 may operate according to one or more of International Telecommunications Union Telecommunication Standardization Sector (ITU-T) H.263, ITU-T H.264 and Moving Picture Expert Group (MPEG)-4 Visual (also known as Advanced Video Coding (AVC)), ITU-T H.265 and MPEG-H Part 2 (also known as High Efficiency Video Coding (HEVC), ITU-T H.265 and MPEG-I Part 3 (also known as Versatile Video Coding (VVC)), the WebM VP8 and VP9 codecs, and AOMedia Video 1 (AV1).

Figure 2:
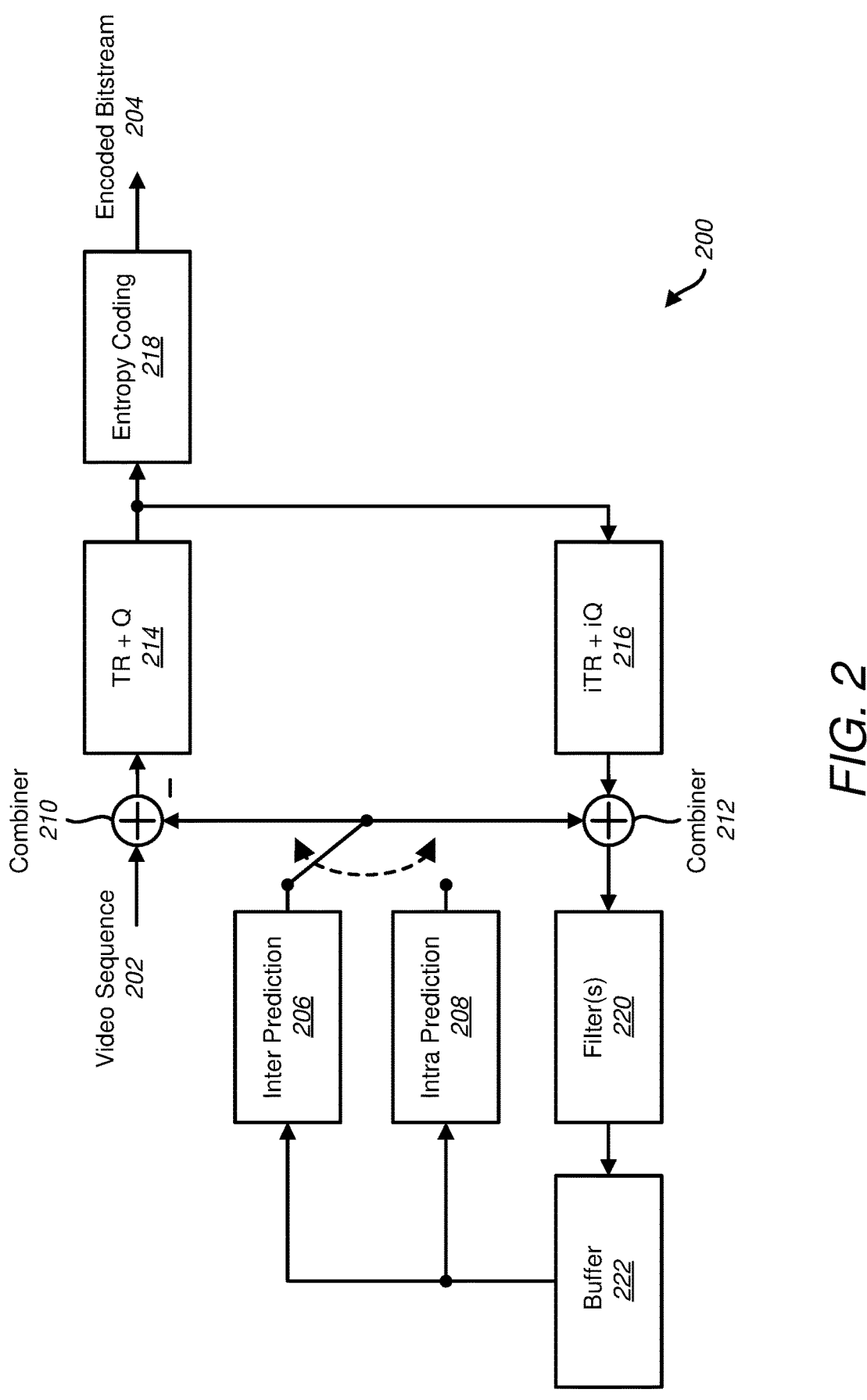
FIG. 2 illustrates an exemplary encoder in which embodiments of the present disclosure may be implemented.

FIG. 2 illustrates an exemplary encoder 200 in which embodiments of the present disclosure may be implemented. Encoder 200 encodes a video sequence 202 into an encoded bitstream 204 for more efficient storage and/or transmission. Encoder 200 may be implemented in video coding/decoding system 100 in FIG. 1 or in any one of a number of different devices, including a desktop computer, laptop computer, tablet computer, smart phone, wearable device, television, camera, video gaming console, set-top box, or video streaming device. Encoder 200 comprises an inter prediction unit 206, an intra prediction unit 208, combiners 210 and 212, a transform and quantization unit (TR+Q) unit 214, an inverse transform and quantization unit (iTR+iQ) 216, entropy coding unit 218, one or more filters 220, and a buffer 222.

Encoder 200 may partition the pictures of video sequence 202 into blocks and encode video sequence 202 on a block-by-block basis. Encoder 200 may perform a prediction technique on a block being encoded using either inter prediction unit 206 or intra prediction unit 208. Inter prediction unit 206 may perform inter prediction by searching for a block similar to the block being encoded in another, reconstructed picture (also referred to as a reference picture) of video sequence 202. A reconstructed picture refers to a picture that was encoded and then decoded. The block determined during the search (also referred to as a prediction block) may then be used to predict the block being encoded to remove redundant information. Inter prediction unit 206 may exploit temporal redundancy or similarities in scene content from picture to picture in video sequence 202 to determine the prediction block. For example, scene content between pictures of video sequence 202 may be similar except for differences due to motion or affine transformation of the screen content over time.

Intra prediction unit 208 may perform intra prediction by forming a prediction block based on data from reconstructed neighboring samples of the block to be encoded within the same picture of video sequence 202. A reconstructed sample refers to a sample that was encoded and then decoded. Intra prediction unit 208 may exploit spatial redundancy or similarities in scene content within a picture of video sequence 202 to determine the prediction block. For example, the texture of a region of scene content in a picture may be similar to the texture in the immediate surrounding area of the region of the scene content in the same picture.

After prediction, combiner 210 may determine a prediction error (also referred to as a residual) based on the difference between the block being encoded and the prediction block. The prediction error may represent non-redundant information that may be transmitted to a decoder for accurate decoding of a video sequence.

Transform and quantization unit 214 may transform and quantize the prediction error. Transform and quantization unit 214 may transform the prediction error into transform coefficients by applying, for example, a DCT to reduce correlated information in the prediction error. Transform and quantization unit 214 may quantize the coefficients by mapping data of the transform coefficients to a predefined set of representative values. Transform and quantization unit 214 may quantize the coefficients to reduce irrelevant information in encoded bitstream 204. Irrelevant information is information that may be removed from the coefficients without producing visible and/or perceptible distortion in video sequence 202 after decoding.

Entropy coding unit 218 may apply one or more entropy coding methods to the quantized transform coefficients to further reduce the bit rate. For example, entropy coding unit 218 may apply context adaptive variable length coding (CAVLC), context adaptive binary arithmetic coding (CABAC), and syntax-based context-based binary arithmetic coding (SBAC). The entropy coded coefficients are packed to form encoded bitstream 204.

Inverse transform and quantization unit 216 may inverse quantize and inverse transform the quantized transform coefficients to determine a reconstructed prediction error. Combiner 212 may combine the reconstructed prediction error with the prediction block to form a reconstructed block. Filter(s) 220 may filter the reconstructed block using, for example, a deblocking filter and/or a sample-adaptive offset (SAO) filter. Buffer 222 may store the reconstructed block for prediction of one or more other blocks in the same and/or different picture of video sequence 202.

Although not shown in FIG. 2, encoder 200 further comprises an encoder control unit configured to control one or more of the units of encoder 200 shown in FIG. 2. The encoder control unit may control the one or more units of encoder 200 such that encoded bitstream 204 is generated in conformance with the requirements of any one of a number of proprietary or industry video coding standards. For example, The encoder control unit may control the one or more units of encoder 200 such that encoded bitstream 204 is generated in conformance with one or more of ITU-T H.263, AVC, HEVC, VVC, VP8, VP9, and AV1 video coding standards.

Within the constraints of a proprietary or industry video coding standard, the encoder control unit may attempt to minimize or reduce the bitrate of encoded bitstream 204 and maximize or increase the reconstructed video quality. For example, the encoder control unit may attempt to minimize or reduce the bitrate of encoded bitstream 204 given a level that the reconstructed video quality may not fall below, or attempt to maximize or increase the reconstructed video quality given a level that the bit rate of encoded bitstream 204 may not exceed. The encoder control unit may determine/control one or more of: partitioning of the pictures of video sequence 202 into blocks, whether a block is inter predicted by inter prediction unit 206 or intra predicted by intra prediction unit 208, a motion vector for inter prediction of a block, an intra prediction mode among a plurality of intra prediction modes for intra prediction of a block, filtering performed by filter(s) 220, and one or more transform types and/or quantization parameters applied by transform and quantization unit 214. The encoder control unit may determine/control the above based on how the determination/control effects a rate-distortion measure for a block or picture being encoded. The encoder control unit may determine/control the above to reduce the rate-distortion measure for a block or picture being encoded.

After being determined, the prediction type used to encode a block (intra or inter prediction), prediction information of the block (intra prediction mode if intra predicted, motion vector, etc.), and transform and quantization parameters, may be sent to entropy coding unit 218 to be further compressed to reduce the bit rate. The prediction type, prediction information, and transform and quantization parameters may be packed with the prediction error to form encoded bitstream 204.

It should be noted that encoder 200 is presented by way of example and not limitation. In other examples, encoder 200 may have other components and/or arrangements. For example, one or more of the components shown in FIG. 2 may be optionally included in encoder 200, such as entropy coding unit 218 and filters(s) 220.

Figure 3:
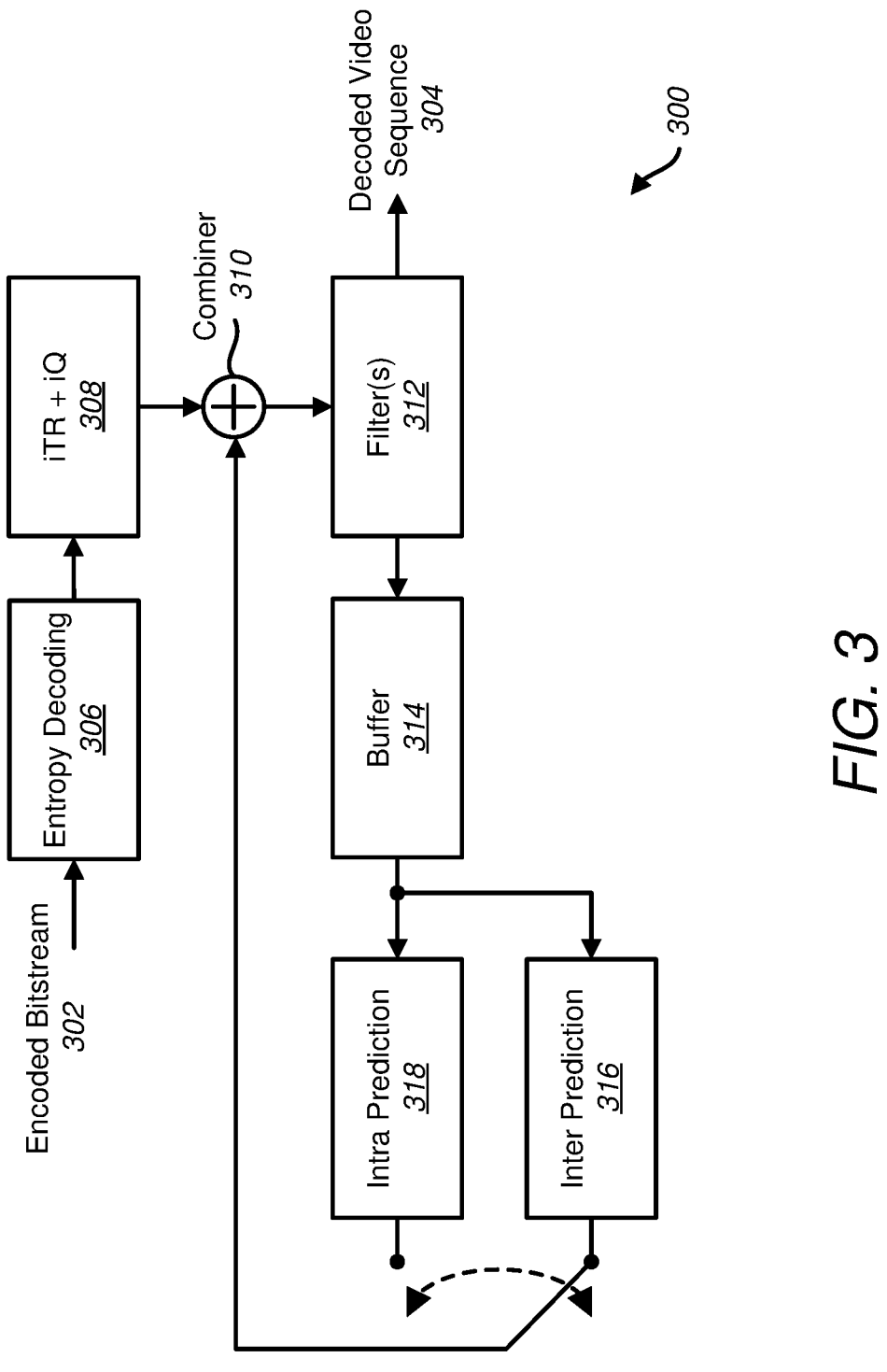
FIG. 3 illustrates an exemplary decoder in which embodiments of the present disclosure may be implemented.

FIG. 3 illustrates an exemplary decoder 300 in which embodiments of the present disclosure may be implemented. Decoder 300 decodes an encoded bitstream 302 into a decoded video sequence for display and/or some other form of consumption. Decoder 300 may be implemented in video coding/decoding system 100 in FIG. 1 or in any one of a number of different devices, including a desktop computer, laptop computer, tablet computer, smart phone, wearable device, television, camera, video gaming console, set-top box, or video streaming device. Decoder 300 comprises an entropy decoding unit 306, an inverse transform and quantization (iTR+iQ) unit 308, a combiner 310, one or more filters 312, a buffer 314, an inter prediction unit 316, and an intra prediction unit 318.

Although not shown in FIG. 3, decoder 300 further comprises a decoder control unit configured to control one or more of the units of decoder 300 shown in FIG. 3. The decoder control unit may control the one or more units of decoder 300 such that encoded bitstream 302 is decoded in conformance with the requirements of any one of a number of proprietary or industry video coding standards. For example, The decoder control unit may control the one or more units of decoder 300 such that encoded bitstream 302 is decoded in conformance with one or more of ITU-T H.263, AVC, HEVC, VVC, VP8, VP9, and AV1 video coding standards.

The decoder control unit may determine/control one or more of: whether a block is inter predicted by inter prediction unit 316 or intra predicted by intra prediction unit 318, a motion vector for inter prediction of a block, an intra prediction mode among a plurality of intra prediction modes for intra prediction of a block, filtering performed by filter(s) 312, and one or more inverse transform types and/or inverse quantization parameters to be applied by inverse transform and quantization unit 308. One or more of the control parameters used by the decoder control unit may be packed in encoded bitstream 302.

Entropy decoding unit 306 may entropy decode the encoded bitstream 302. Inverse transform and quantization unit 308 may inverse quantize and inverse transform the quantized transform coefficients to determine a decoded prediction error. Combiner 310 may combine the decoded prediction error with a prediction block to form a decoded block. The prediction block may be generated by inter prediction unit 318 or inter prediction unit 316 as described above with respect to encoder 200 in FIG. 2. Filter(s) 312 may filter the decoded block using, for example, a deblocking filter and/or a sample-adaptive offset (SAO) filter. Buffer 314 may store the decoded block for prediction of one or more other blocks in the same and/or different picture of the video sequence in encoded bitstream 302. Decoded video sequence 304 may be output from filter(s) 312 as shown in FIG. 3.

It should be noted that decoder 300 is presented by way of example and not limitation. In other examples, decoder 300 may have other components and/or arrangements. For example, one or more of the components shown in FIG. 3 may be optionally included in decoder 300, such as entropy decoding unit 306 and filters(s) 312.

It should be further noted that, although not shown in FIGS. 2 and 3, each of encoder 200 and decoder 300 may further comprise an intra block copy unit in addition to inter prediction and intra prediction units. The intra block copy unit may perform similar to an inter prediction unit but predict blocks within the same picture. For example, the intra block copy unit may exploit repeated patterns that appear in screen content. Screen content may include, for example, computer generated text, graphics, and animation.

As mentioned above, video encoding and decoding may be performed on a block-by-block basis. The process of partitioning a picture into blocks may be adaptive based on the content of the picture. For example, larger block partitions may be used in areas of a picture with higher levels of homogeneity to improve coding efficiency.

In HEVC, a picture may be partitioned into non-overlapping square blocks, referred to as coding tree blocks (CTBs), comprising samples of a sample array. A CTB may have a size of $2^n \times 2^n$ samples, where n may be specified by a parameter of the encoding system. For example, n may be 4, 5, or 6. A CTB may be further partitioned by a recursive quadtree partitioning into coding blocks (CBs) of half vertical and half horizontal size. The CTB forms the root of the quadtree. A CB that is not split further as part of the recursive quadtree partitioning may be referred to as a leaf-CB of the quadtree and otherwise as a non-leaf CB of the quadtree. A CB may have a minimum size specified by a parameter of the encoding system. For example, a CB may have a minimum size of 4×4, 8×8, 16×16, 32×32, or 64×64 samples. For inter and intra prediction, a CB may be further partitioned into one or more prediction blocks (PBs) for performing inter and intra prediction. A PB may be a rectangular block of samples on which the same prediction type/mode may be applied. For transformations, a CB may be partitioned into one or more transform blocks (TBs). A TB may be a rectangular block of samples that may determine an applied transform size.

Figure 4:
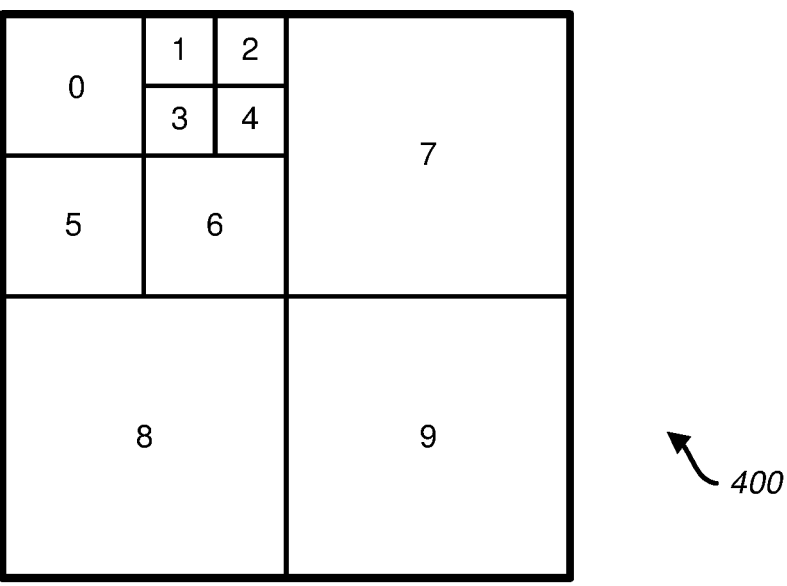
FIG. 4 illustrates an example quadtree partitioning of a coding tree block (CTB) in accordance with embodiments of the present disclosure.
Figure 5:
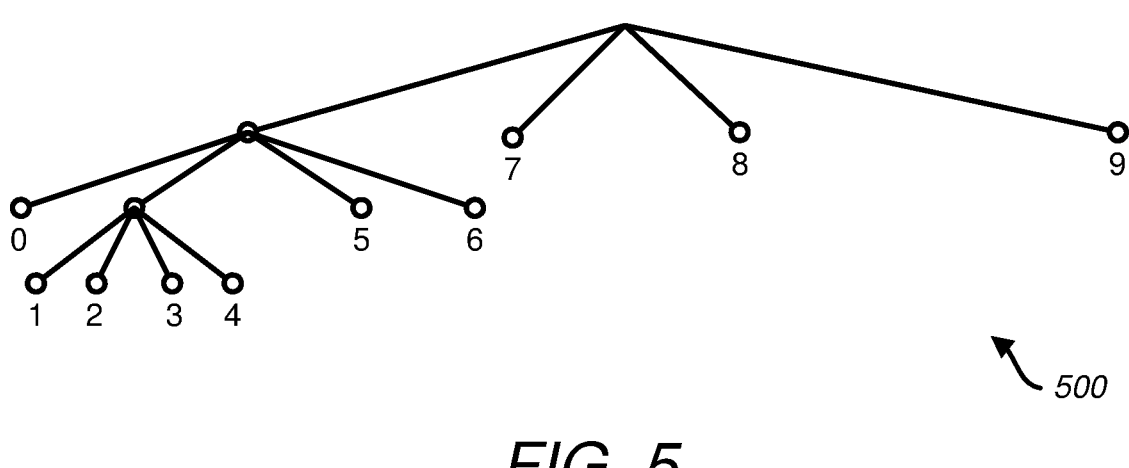
FIG. 5 illustrates a corresponding quadtree of the example quadtree partitioning of the CTB in FIG. 4 in accordance with embodiments of the present disclosure.

FIG. 4 illustrates an example quadtree partitioning of a CTB 400. FIG. 5 illustrates a corresponding quadtree 500 of the example quadtree partitioning of CTB 400 in FIG. 4. As shown in FIGS. 4 and 5, CTB 400 is first partitioned into four CBs of half vertical and half horizontal size. Three of the resulting CBs of the first level partitioning of CTB 400 are leaf-CBs. The three leaf CBs of the first level partitioning of CTB 400 are respectively labeled 7, 8, and 9 in FIGS. 4 and 5. The non-leaf CB of the first level partitioning of CTB 400 is partitioned into four sub-CBs of half vertical and half horizontal size. Three of the resulting sub-CBs of the second level partitioning of CTB 400 are leaf CBs. The three leaf CBs of the second level partitioning of CTB 400 are respectively labeled 0, 5, and 6 in FIGS. 4 and 5. Finally, the non-leaf CB of the second level partitioning of CTB 400 is partitioned into four leaf CBs of half vertical and half horizontal size. The four leaf CBs are respectively labeled 1, 2, 3, and 4 in FIGS. 4 and 5.

Altogether, CTB 400 is partitioned into 10 leaf CBs respectively labeled 0-9. The resulting quadtree partitioning of CTB 400 may be scanned using a z-scan (left-to-right, top-to-bottom) to form the sequence order for encoding/decoding the CB leaf nodes. The numeric label of each CB leaf node in FIGS. 4 and 5 may correspond to the sequence order for encoding/decoding, with CB leaf node 0 encoded/decoded first and CB leaf node 9 encoded/decoded last. Although not shown in FIGS. 4 and 5, it should be noted that each CB leaf node may comprise one or more PBs and TBs.

Figure 6:
FIG. 6 illustrates example binary and ternary tree partitions in accordance with embodiments of the present disclosure.

In VVC, a picture may be partitioned in a similar manner as in HEVC. A picture may be first partitioned into non-overlapping square CTBs. The CTBs may then be partitioned by a recursive quadtree partitioning into CBs of half vertical and half horizontal size. In VVC, a quadtree leaf node may be further partitioned by a binary tree or ternary tree partitioning into CBs of unequal sizes. FIG. 6 illustrates example binary and ternary tree partitions. A binary tree partition may divide a parent block in half in either the vertical direction 602 or horizontal direction 604. The resulting partitions may be half in size as compared to the parent block. A ternary tree partition may divide a parent block into three parts in either the vertical direction 606 or horizontal direction 608. The middle partition may be twice as large as the other two end partitions in a ternary tree partition.

Figure 7:
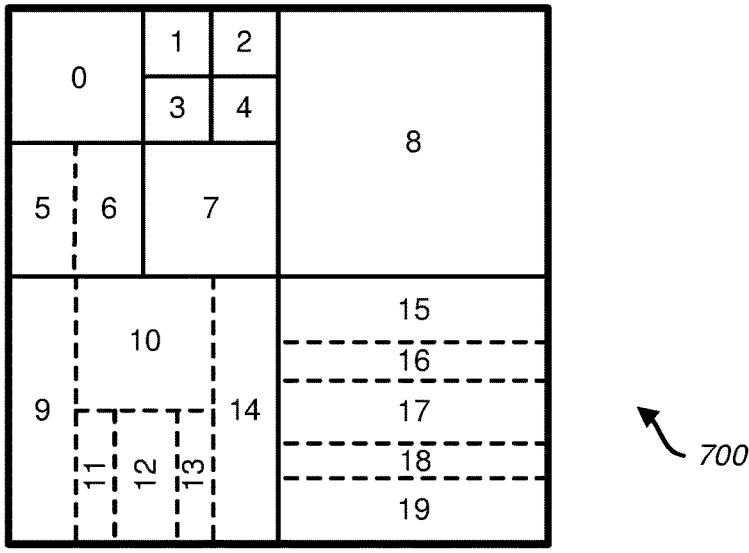
FIG. 7 illustrates an example quadtree+multi-type tree partitioning of a CTB in accordance with embodiments of the present disclosure.
Figure 8:
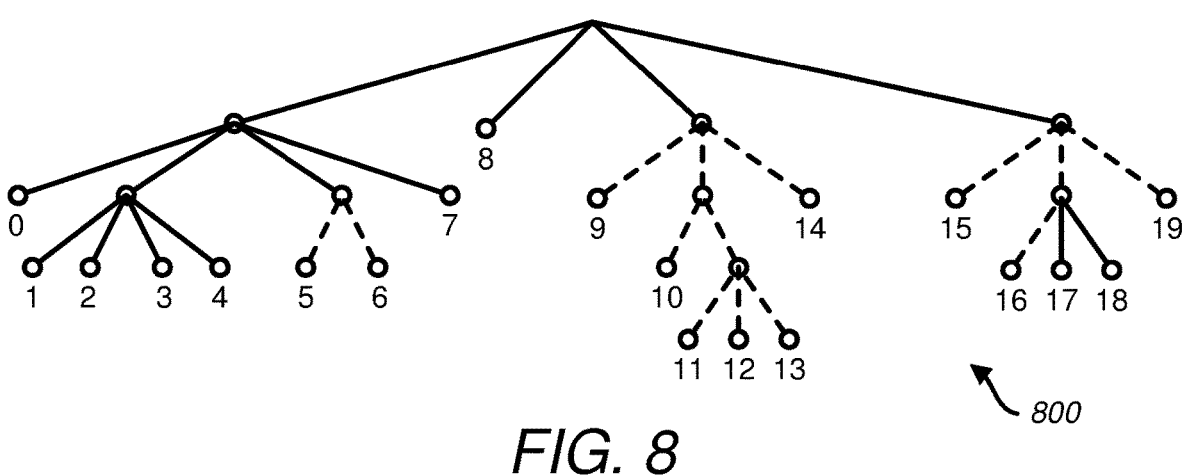
FIG. 8 illustrates a corresponding quadtree+multi-type tree of the example quadtree+multi-type tree partitioning of the CTB in FIG. 7 in accordance with embodiments of the present disclosure.

Because of the addition of binary and ternary tree partitioning, in VVC the block partitioning strategy may be referred to as quadtree+multi-type tree partitioning. FIG. 7 illustrates an example quadtree+multi-type tree partitioning of a CTB 700. FIG. 8 illustrates a corresponding quadtree+ multi-type tree 800 of the example quadtree+multi-type tree partitioning of CTB 700 in FIG. 7. In both FIGS. 7 and 8, quadtree splits are shown in solid lines and multi-type tree splits are shown in dashed lines. For ease of explanation, CTB 700 is shown with the same quadtree partitioning as CTB 400 described in FIG. 4. Therefore, description of the quadtree partitioning of CTB 700 is omitted. The description of the additional multi-type tree partitions of CTB 700 is made relative to three leaf-CBs shown in FIG. 4 that have been further partitioned using one or more binary and ternary tree partitions. The three leaf-CBs in FIG. 4 that are shown in FIG. 7 as being further partitioned are leaf-CBs 5, 8, and 9.

Starting with leaf-CB 5 in FIG. 4, FIG. 7 shows this leaf-CB partitioned into two CBs based on a vertical binary tree partitioning. The two resulting CBs are leaf-CBs respectively labeled 5 and 6 in FIGS. 7 and 8. With respect to leaf-CB 8 in FIG. 4, FIG. 7 shows this leaf-CB partitioned into three CBs based on a vertical ternary tree partition. Two of the three resulting CBs are leaf-CBs respectively labeled 9 and 14 in FIGS. 7 and 8. The remaining, non-leaf CB is partitioned first into two CBs based on a horizontal binary tree partition, one of which is a leaf-CB labeled 10 and the other of which is further partitioned into three CBs based on a vertical ternary tree partition. The resulting three CBs are leaf-CBs respectively labeled 11, 12, and 13 in FIGS. 7 and 8. Finally, with respect to leaf-CB 9 in FIG. 4, FIG. 7 shows this leaf-CB partitioned into three CBs based on a horizontal ternary tree partition. Two of the three CBs are leaf-CBs respectively labeled 15 and 19 in FIGS. 7 and 8. The remaining, non-leaf CB is partitioned into three CBs based on another horizontal ternary tree partition. The resulting three CBs are all leaf-CBs respectively labeled 16, 17, and 18 in FIGS. 7 and 8.

Altogether, CTB 700 is partitioned into 20 leaf CBs respectively labeled 0-19. The resulting quadtree+multi-type tree partitioning of CTB 700 may be scanned using a z-scan (left-to-right, top-to-bottom) to form the sequence order for encoding/decoding the CB leaf nodes. The numeric label of each CB leaf node in FIGS. 7 and 8 may correspond to the sequence order for encoding/decoding, with CB leaf node 0 encoded/decoded first and CB leaf node 19 encoded/decoded last. Although not shown in FIGS. 7 and 8, it should be noted that each CB leaf node may comprise one or more PBs and TBs.

In addition to specifying various blocks (e.g., CTB, CB, PB, TB), HEVC and VVC further define various units. While blocks may comprise a rectangular area of samples in a sample array, units may comprise the collocated blocks of samples from the different sample arrays (e.g., luma and chroma sample arrays) that form a picture as well as syntax elements and prediction data of the blocks. A coding tree unit (CTU) may comprise the collocated CTBs of the different sample arrays and may form a complete entity in an encoded bit stream. A coding unit (CU) may comprise the collocated CBs of the different sample arrays and syntax structures used to code the samples of the CBs. A prediction unit (PU) may comprise the collocated PBs of the different sample arrays and syntax elements used to predict the PBs. A transform unit (TU) may comprise TB s of the different samples arrays and syntax elements used to transform the TBs.

It should be noted that the term block may be used to refer to any of a CTB, CB, PB, TB, CTU, CU, PU, or TU in the context of HEVC and VVC. It should be further noted that the term block may be used to refer to similar data structures in the context of other video coding standards. For example, the term block may refer to a macroblock in AVC, a macroblock or sub-block in VP8, a superblock or sub-block in VP9, or a superblock or sub-block in AV1.

In intra prediction, samples of a block to be encoded (also referred to as the current block) may be predicted from decoded samples of the column immediately adjacent to the left-most column of the current block and decoded samples of the row immediately adjacent to the top-most row of the current block. The samples from the immediately adjacent column and row may be jointly referred to as reference samples. Each sample of the current block may be predicted by projecting the position of the sample in the current block in a given direction (also referred to as an intra prediction mode in H.264, HEVC, AV1, and VVC standards) to a point along the reference samples. The sample may be predicted by interpolating between the two closest reference samples of the projection point if the projection does not fall directly on a reference sample. A prediction error (also referred to as a residual) may be determined for the current block based on differences between the predicted sample values and the original sample values of the current block.

At an encoder, this process of predicting samples and determining a prediction error based on a difference between the predicted samples and original samples may be performed for a plurality of different intra prediction modes, including non-directional intra prediction modes. The encoder may select one of the plurality of intra prediction modes and its corresponding prediction error to encode the current block. The encoder may send an indication of the selected prediction mode and its corresponding prediction error to a decoder for decoding of the current block. The decoder may decode the current block by predicting the samples of the current block using the intra prediction mode indicated by the encoder and combining the predicted samples with the prediction error.

Figure 9:
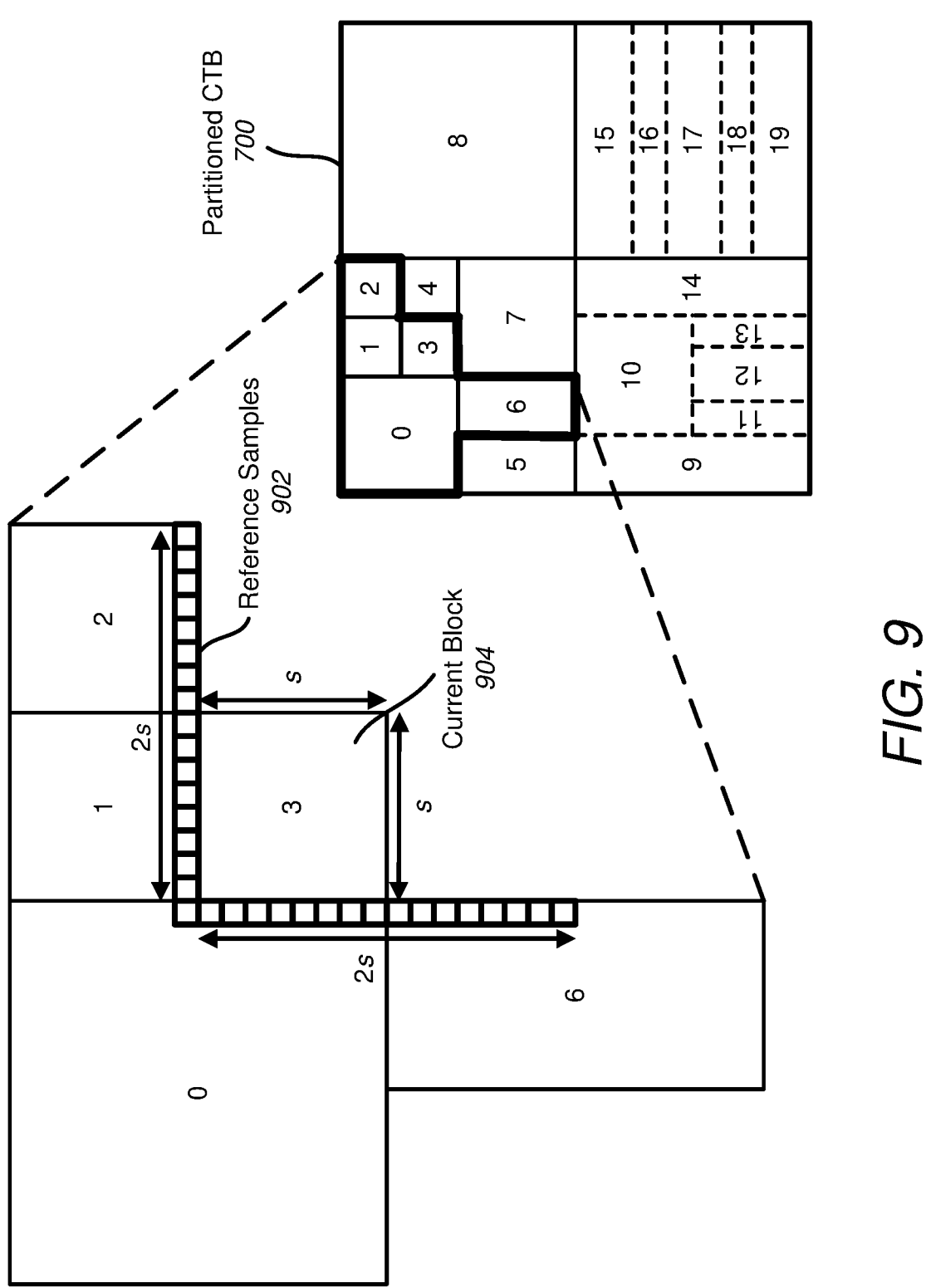
FIG. 9 illustrates an example set of reference samples determined for intra prediction of a current block being encoded or decoded in accordance with embodiments of the present disclosure.

FIG. 9 illustrates an example set of reference samples 902 determined for intra prediction of a current block 904 being encoded or decoded. In FIG. 9, current block 904 corresponds to block 3 of partitioned CTB 700 in FIG. 7. As explained above, the numeric labels 0-19 of the blocks of partitioned CTB 700 may correspond to the sequence order for encoding/decoding the blocks and are used as such in the example of FIG. 9.

Given current block 904 is of w×h samples in size, reference samples 902 may extend over 2w samples of the row immediately adjacent to the top-most row of current block 904, 2h samples of the column immediately adjacent to the left-most column of current block 904, and the top left neighboring corner sample to current block 904. In the example of FIG. 9, current block 904 is square, so w=h=s. For constructing the set of reference samples 902, available samples from neighboring decoded blocks of current block 904 may be used. Samples may not be available for constructing the set of reference samples 902 if, for example, the samples would lie outside the picture of the current block, the samples are part of a different slice of the current block (where the concept of slices are used), and/or the samples belong to blocks that have been inter coded and constrained intra prediction is indicated. When constrained intra prediction is indicated, intra prediction may not be dependent on inter predicted blocks.

In addition to the above, samples that may not be available for constructing the set of reference samples 902 include samples in blocks that have not already been encoded and reconstructed at an encoder or decoded at a decoder based on the sequence order for encoding/decoding. This restriction may allow identical prediction results to be determined at both the encoder and decoder. In FIG. 9, samples from neighboring blocks 0, 1, and 2 may be available to construct reference samples 902 given that these blocks are encoded and reconstructed at an encoder and decoded at a decoder prior to coding of current block 904. This assumes there are no other issues, such as those mentioned above, preventing the availability of samples from neighboring blocks 0, 1, and 2. However, the portion of reference samples 902 from neighboring block 6 may not be available due to the sequence order for encoding/decoding.

Unavailable ones of reference samples 902 may be filled with available ones of reference samples 902. For example, an unavailable reference sample may be filled with a nearest available reference sample determined by moving in a clock-wise direction through reference samples 902 from the position of the unavailable reference. If no reference samples are available, reference samples 902 may be filled with the mid-value of the dynamic range of the picture being coded.

It should be noted that reference samples 902 may be filtered based on the size of current block 904 being coded and an applied intra prediction mode. It should be further noted that FIG. 9 illustrates only one exemplary determination of reference samples for intra prediction of a block. In some proprietary and industry video coding standards, reference samples may be determined in a different manner than discussed above. For example, multiple reference lines may be used in other instances, such as used in VVC.

After reference samples 902 are determined and optionally filtered, samples of current block 904 may be intra predicted based on reference samples 902. Most encoders/decoders support a plurality of intra prediction modes in accordance with one or more video coding standards. For example, HEVC supports 35 intra prediction modes, including a planar mode, a DC mode, and 33 angular modes. VVC supports 67 intra prediction modes, including a planar mode, a DC mode, and 65 angular modes. Planar and DC modes may be used to predict smooth and gradually changing regions of a picture. Angular modes may be used to predict directional structures in regions of a picture.

Figure 10A:
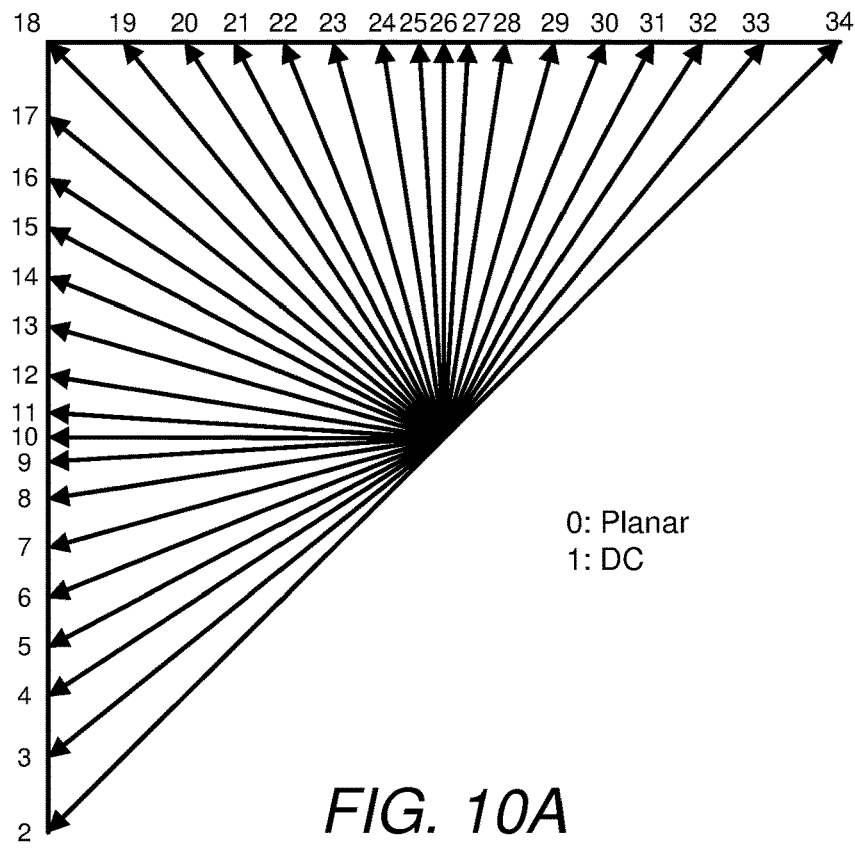
FIG. 10A illustrates the 35 intra prediction modes supported by HEVC in accordance with embodiments of the present disclosure.

FIG. 10A illustrates the 35 intra prediction modes supported by HEVC. The 35 intra prediction modes are identified by indices 0 to 34. Prediction mode 0 corresponds to planar mode. Prediction mode 1 corresponds to DC mode. Prediction modes 2-34 correspond to angular modes. Prediction modes 2-17 may be referred to as horizontal prediction modes because the principal source of prediction is in the horizontal direction. Prediction modes 18-34 may be referred to as vertical prediction modes because the principal source of prediction is in the vertical direction.

Figure 10B:
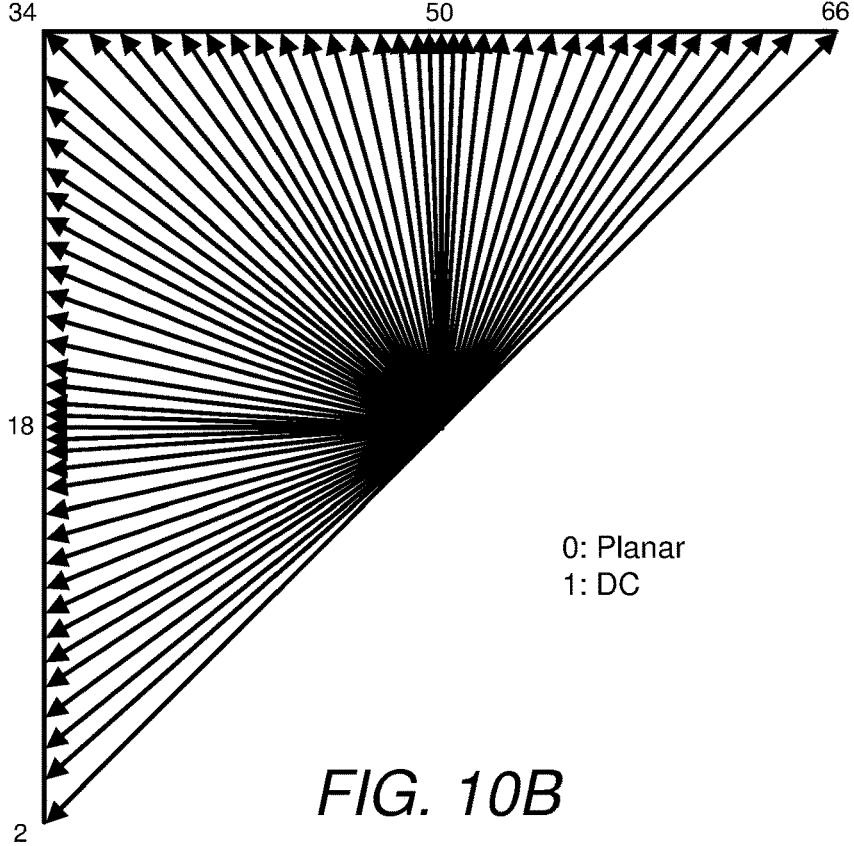
FIG. 10B illustrates the 67 intra prediction modes supported by HEVC in accordance with embodiments of the present disclosure.

FIG. 10B illustrates the 67 intra prediction modes supported by VVC. The 67 intra prediction modes are identified by indices 0 to 66. Prediction mode 0 corresponds to planar mode. Prediction mode 1 corresponds to DC mode. Prediction modes 2-66 correspond to angular modes. Prediction modes 2-33 may be referred to as horizontal prediction modes because the principal source of prediction is in the horizontal direction. Prediction modes 34-66 may be referred to as vertical prediction modes because the principal source of prediction is in the vertical direction. Because blocks in VVC may be non-square, some of the intra prediction modes illustrated in FIG. 10B may be adaptively replaced by wide-angle directions.

Figure 11:
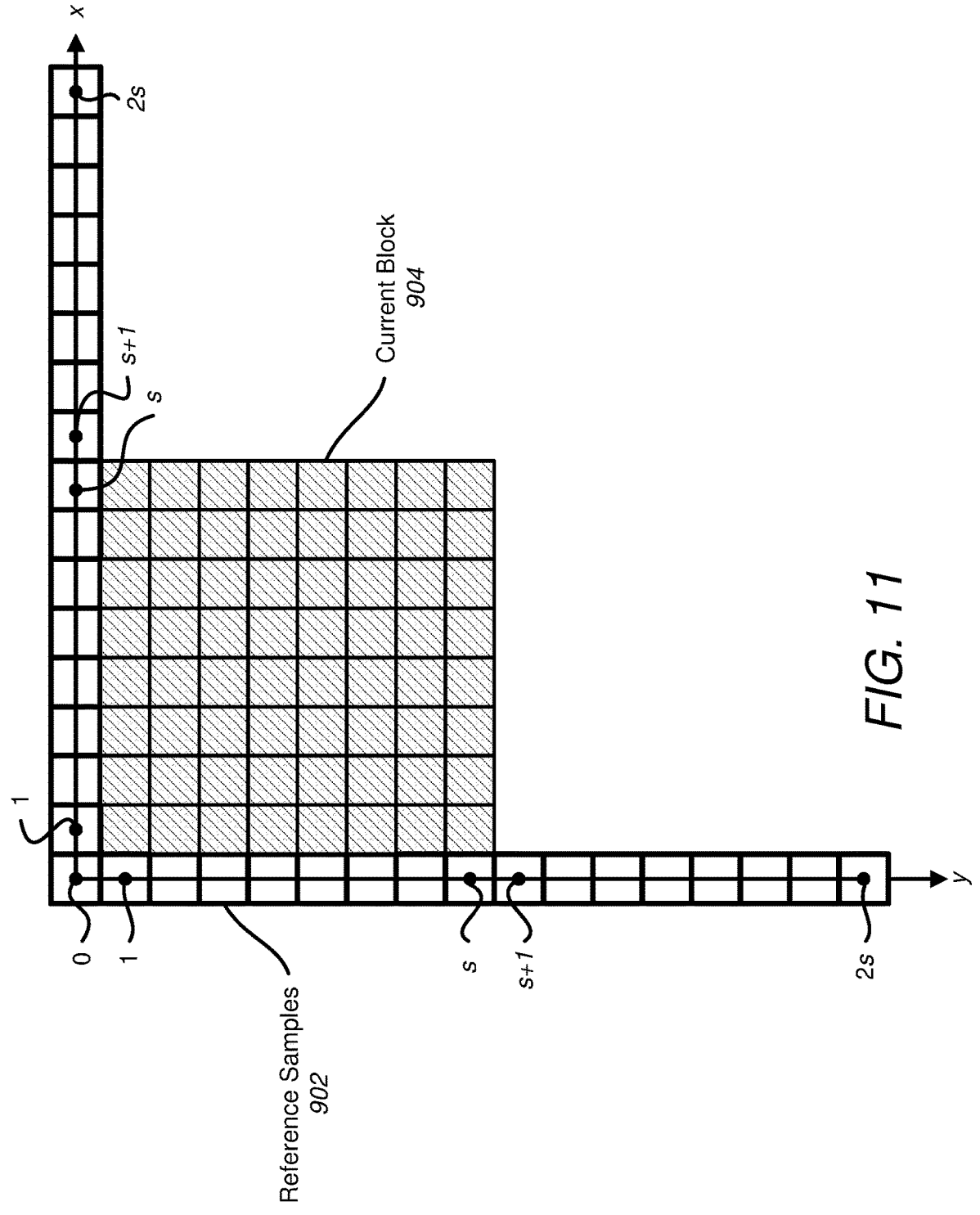
FIG. 11 illustrates the current block and reference samples from FIG. 9 in a two-dimensional x, y plane in accordance with embodiments of the present disclosure.
Figure 12:
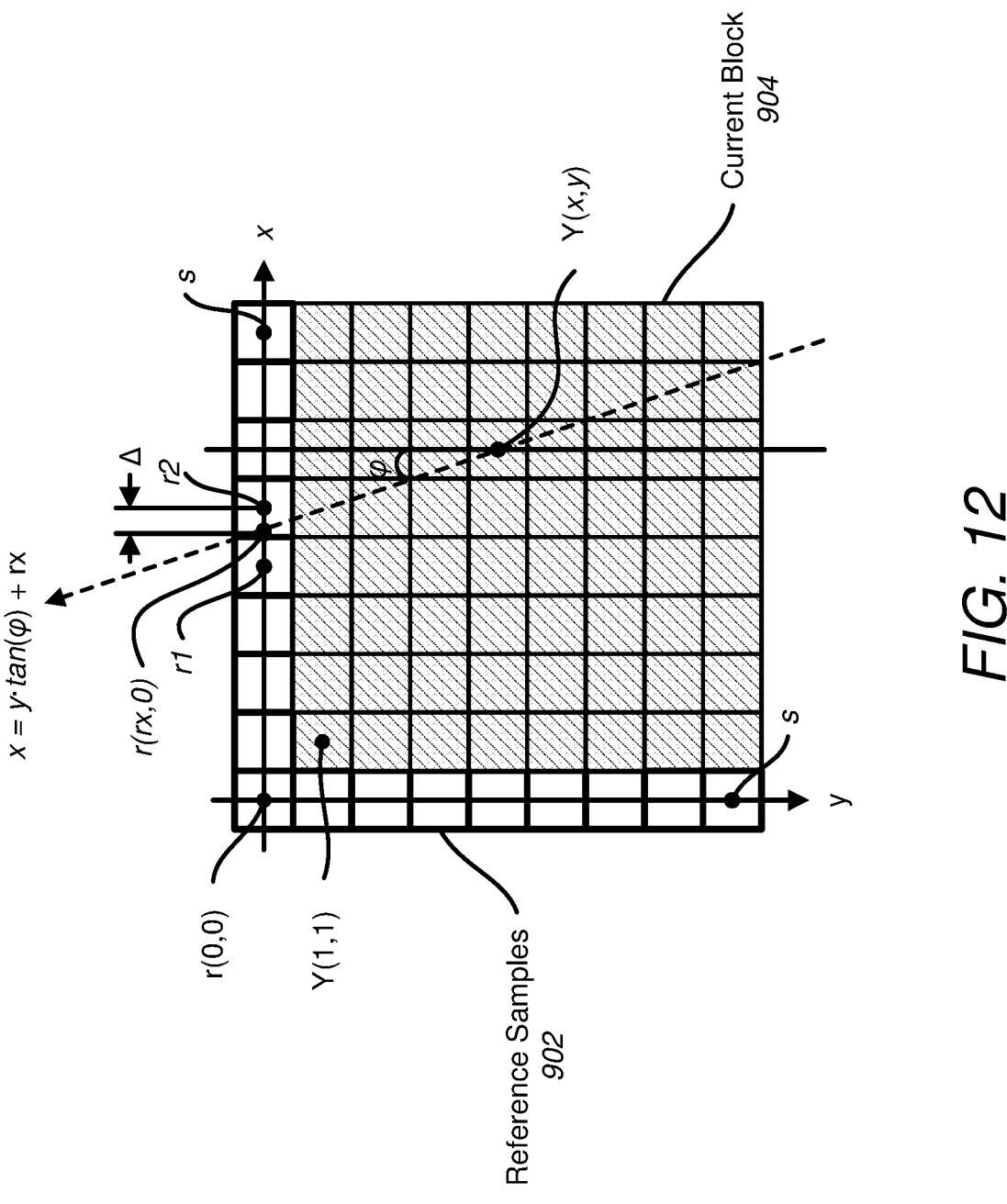
FIG. 12 illustrates an example of an angular prediction of the current block from FIG. 9 in accordance with embodiments of the present disclosure.

To further describe the application of intra prediction modes to determine a prediction of a current block, reference is made to FIGS. 11 and 12. In FIG. 11, current block 904 and reference samples 902 from FIG. 9 are shown in a two-dimensional x, y plane. Current block 904 is referred to as Y, where $\hat{Y}(x, y)$ denotes the predicted value of current block 904 at the coordinates (x, y). Reference samples 902 are referred to as r, where r(x, y) denotes the reference sample of reference samples 902 at the coordinates (x, y).

For planar mode, a sample in Y may be predicted by calculating the mean of two interpolated values. The first of the two interpolated values may be based on a horizontal linear interpolation of the predicted sample in Y. The second of the two interpolated values may be based on a vertical linear interpolation of the predicted sample in Y. The predicted value of the sample in Y may be calculated as $$\hat{Y}(x, y) = \frac{1}{2 \cdot s}(h(x, y) + v(x, y) + s) \text{ where} \tag{1}$$

$$h(x, y) = (s - x) \cdot r(0, y) + (x) \cdot r(s, 0) \tag{2}$$

may be the horizontal linear interpolation of the predicted sample in Y and $$v(x,y)=(s-y) \cdot r(x,0)+(y) \cdot r(0,s) \tag{3}$$

may be the vertical linear interpolation of the predicted sample in Y.

For DC mode, a sample in Y may be predicted by the mean of the reference samples. The predicted value of the sample in Y may be calculated as $$\hat{Y}(x, y) = \frac{1}{2 \cdot s} \cdot \left( \sum_{x=1}^{s} r(x, 0) + \sum_{y=1}^{s} r(0, y) \right) \tag{4}$$

A boundary filter may be applied to boundary samples in Y to smooth the transition between the boundary samples and their respective adjacent neighboring reference sample(s) in r.

For angular modes, a sample in Y may be predicted by projecting the position of the sample in a direction specified by a given angular mode to a point on the horizontal or vertical axis comprising the reference samples r. The sample may be predicted by interpolating between the two closest reference samples in r of the projection point if the projection does not fall directly on a reference sample in r. The direction specified by the angular mode (or prediction direction) may be given by an angle $\varphi$ defined relative to the y-axis for vertical prediction modes (e.g., modes 18-34 in HEVC and modes 34-66 in VVC) and relative to the x-axis for horizontal prediction modes (e.g., modes 2-17 in HEVC and modes 2-33 in VVC).

FIG. 12 illustrates a sample in Y predicted for a vertical prediction mode. For vertical prediction modes, the position (x, y) of the sample in Y is projected onto the horizontal axis, intercepting the reference samples at $r(r_x, 0)$. A line projected from the sample in Y to the horizontal axis in the prediction direction of the vertical prediction mode may be represented by a linear equation using the slope-intercept form as $$x=y \cdot m+b \tag{5}$$

where m is the line slope with respect to the vertical axis, and b is the x-intercept point, which is denoted as $r_x$ in the example of FIG. 12. The slope of the line relative to the y-axis may be calculated as the tan $\varphi$. Equation 5 may be calculated as $$x=y \cdot \tan \varphi+r_x \tag{6}$$

where $\varphi$ is the angle of the prediction direction relative to the y-axis.

Similarly, in the case of horizontal prediction modes, a line projected from the sample in Y to the vertical axis in the prediction direction of a horizontal prediction mode may be represented by a linear equation using the slope-intercept form as $$y=x \cdot \tan \varphi+r_y \tag{7}$$

where $\varphi$ is the angle of the prediction direction relative to the x-axis, and $r_y$ is the y-intercept point, Because the projection of the sample in Y falls between two reference samples r1 and r2 in the example of FIG. 12, the predicted value of the sample in Y may be calculated as a linear interpolation between the two nearest reference samples r1 and r2, as $$\hat{Y}(x,y)=\Delta \cdot r1+(1-\Delta) \cdot r2 \tag{8}$$

where $$r1=r(r1_x,0)=r(x+\lfloor-y \cdot \tan \varphi\rfloor,0), \tag{9}$$

$$r2=r(r2_x,0)=r(x+1+\lfloor-y \cdot \tan \varphi\rfloor,0), \tag{10}$$

$$\Delta=r2_x-r_x=(1+\lfloor-y \cdot \tan \varphi\rfloor)+(y \cdot \tan \varphi), \text{ and} \tag{11}$$

$$\lfloor \cdot \rfloor \text{ is an integer floor.} \tag{12}$$

Supplementary reference samples may be constructed for the case where the position (x, y) of a sample in Y to be predicted is projected to a negative x coordinate, which happens with negative angles φ. The supplementary reference samples may be constructed by projecting the reference samples in r on the vertical axis to the horizontal axis using the angle φ.

A sample in Y may be predicted for a horizontal prediction mode in a similar manner as discussed above for vertical prediction modes. For horizontal prediction modes, the position (x, y) of the sample in Y may be projected onto the vertical axis comprising reference samples r, and the angle φ of the prediction direction of the horizontal prediction mode may be defined relative to the x-axis. Supplementary reference samples may be similarly constructed for horizontal prediction modes by projecting the reference samples in r on the horizontal axis to the vertical axis using the angle φ.

An encoder may predict the samples of a current block being encoded, such as current block 904, for a plurality of intra prediction modes as explained above. For example, the encoder may predict the samples of the current block for each of the 35 intra prediction modes in HEVC or 67 intra prediction modes in VVC. For each intra prediction mode applied, the encoder may determine a prediction error for the current block based on a difference (e.g., the sum of squared differences (SSD), the sum of absolute differences (SAD), or sum of absolute transformed differences (SATD)) between the prediction samples determined for the intra prediction mode and the original samples of the current block. The encoder may select one of the intra prediction modes to encode the current block based on the determined prediction errors. For example, the encoder may select an intra prediction mode that results in the smallest prediction error for the current block. In another example, the encoder may select the intra prediction mode to encode the current block based on a rate-distortion measure determined using the prediction errors. The encoder may send an indication of the selected intra prediction mode and its corresponding prediction error to a decoder for decoding of the current block.

The value of weighting factors $\Delta$ and $(1-\Delta)$ may need a floating point representation due to the tan φ resulting in a floating point number. In such a case, floating point operations may also be needed to calculate the predicted value $\hat{Y}$ through linear interpolation. To avoid the use of floating point arithmetic, standards such as H.264, HEVC, and VVC use prediction directions with slopes that are determined by angles φ that the tangent of which (tan φ) is a rational number.

Figure 13:
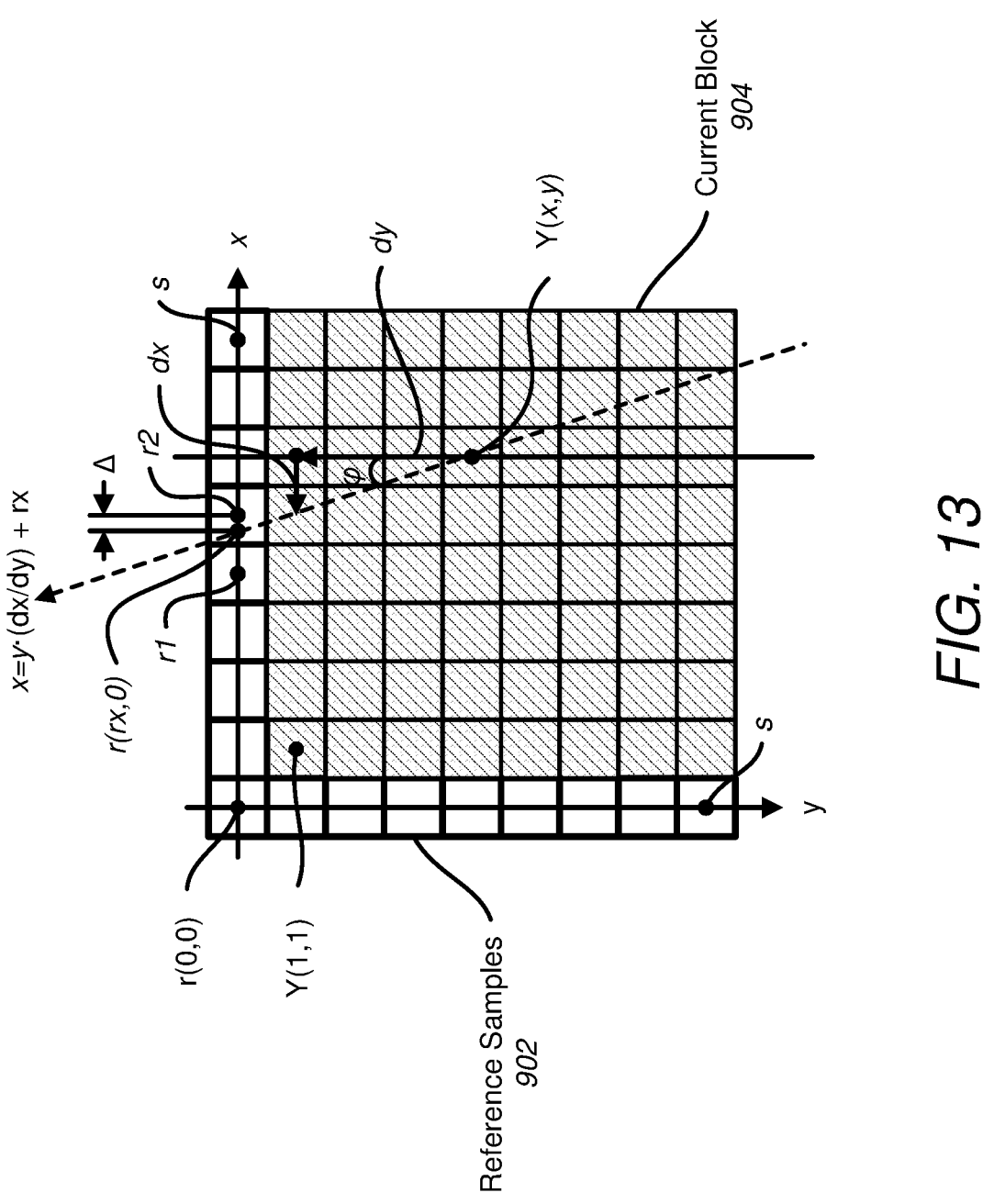
FIG. 13 illustrates an example of a vertical prediction angle using a rational slope for a current block being encoded by an encoder in accordance with embodiments of the present disclosure.

FIG. 13 illustrates a sample in Y predicted for a vertical prediction mode in which the slope of the vertical prediction direction is determined by the quotient of the integer dx divided by the integer dy as $$\tan \varphi = \frac{dx}{dy}; \forall\, dx, dy \in \mathbb{Z}, \text{ and } dy \neq 0 \tag{13}$$

In this example, the weighting factor $\Delta$ may be calculated as $$\Delta = r2_x - r_x = \left(1 + \left\lfloor -y \cdot \frac{dx}{dy} \right\rfloor\right) + \left(y \cdot \frac{dx}{dy}\right); \forall\, dx, dy \in \mathbb{Z}, \text{ and } dy \neq 0, \tag{14}$$

-continued $$\Delta = \left(1 + \left\lfloor -y \cdot \frac{dx}{dy} \right\rfloor\right) + \left(\left\lfloor y \cdot \frac{dx}{dy} \right\rfloor + \frac{(y \cdot dx \bmod dy)}{dy}\right), \forall\, dy \neq 0 \tag{15}$$

$$\Delta = \frac{(y \cdot dx \bmod dy)}{dy}, \forall\, dy \neq 0 \text{ and} \tag{16}$$

$(a \bmod b)$ is the modulo operator $\tag{17}$ that returns the remainder of the division $a/b$ The modulo operator may be denoted by the logical operator &. To avoid a floating point operation in the division, standards may use a value that is a power of two for the dy parameter. A value that is a power of two for the dy parameter allows implementing the division with integer logic, for example, using a right shift operation, and ensures that the value of $\Delta$ is an integer. Consequently, the weighting factor $\Delta$ in equation (15) may be calculated as $$\Delta = ((y \cdot dx) \& (dy-1)) >> \log_2(dy) \tag{18}$$

In addition to the above, the result of (a mod b) returns an integer number between 0 and b−1. Consequently, in the example of FIG. 13, the weighting factor $\Delta$ (equation 16) may only take on dy different values for the same y coordinate of a pixel. This implies that the intra prediction precision may be defined by the quotient's denominator that determines the prediction angle. The prediction precision is determined by the dy component for vertical angles and by the dx component for horizontal angles.

The intra prediction precision may be determined as a fractional pixel precision. For example, an encoder may be predefined with a level of intra precision such as 16, which may be referred to as $\frac{1}{16}$ intra pixel precision.

Figure 14:
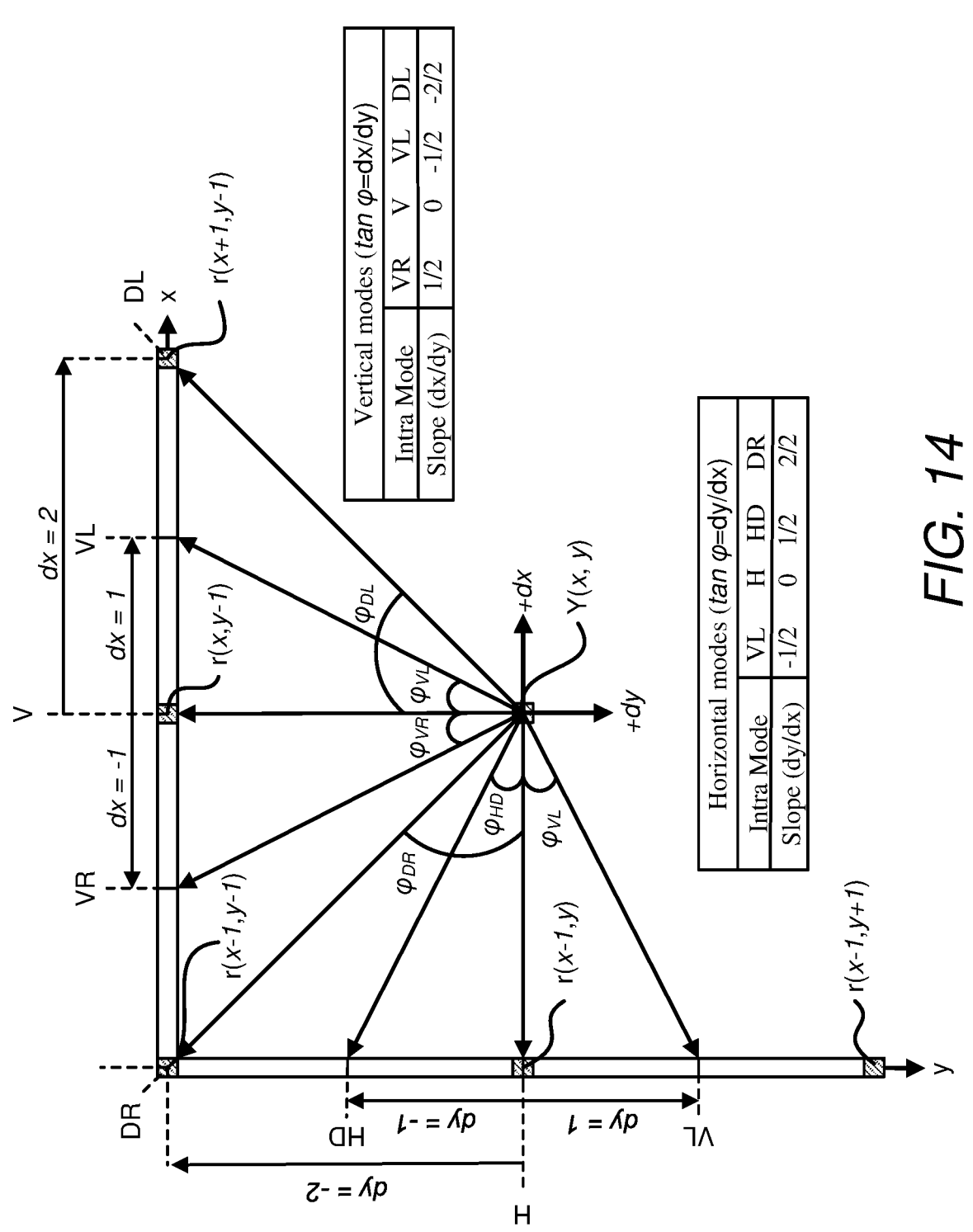
FIG. 14 illustrates an example of angular prediction modes in the H.264 standard for square blocks of 8×8 and 16×16 and their equivalent with the prediction angles using rational slopes in accordance with embodiments of the present disclosure.

Video coding standards determine a level of precision for intra prediction that may be the same for all intra modes. FIG. 14 illustrates the eight intra prediction modes (VL, H, HD, DR, VR, V, VL, and DL) in H.264 defined for square blocks of 8×8 and 4×4. H.264 uses a level of precision of two for both vertical and horizontal prediction modes. The mode DR may be determined as a horizontal or vertical mode. In both cases, the slope of the mode DR is the same (2/2).

Figure 15:
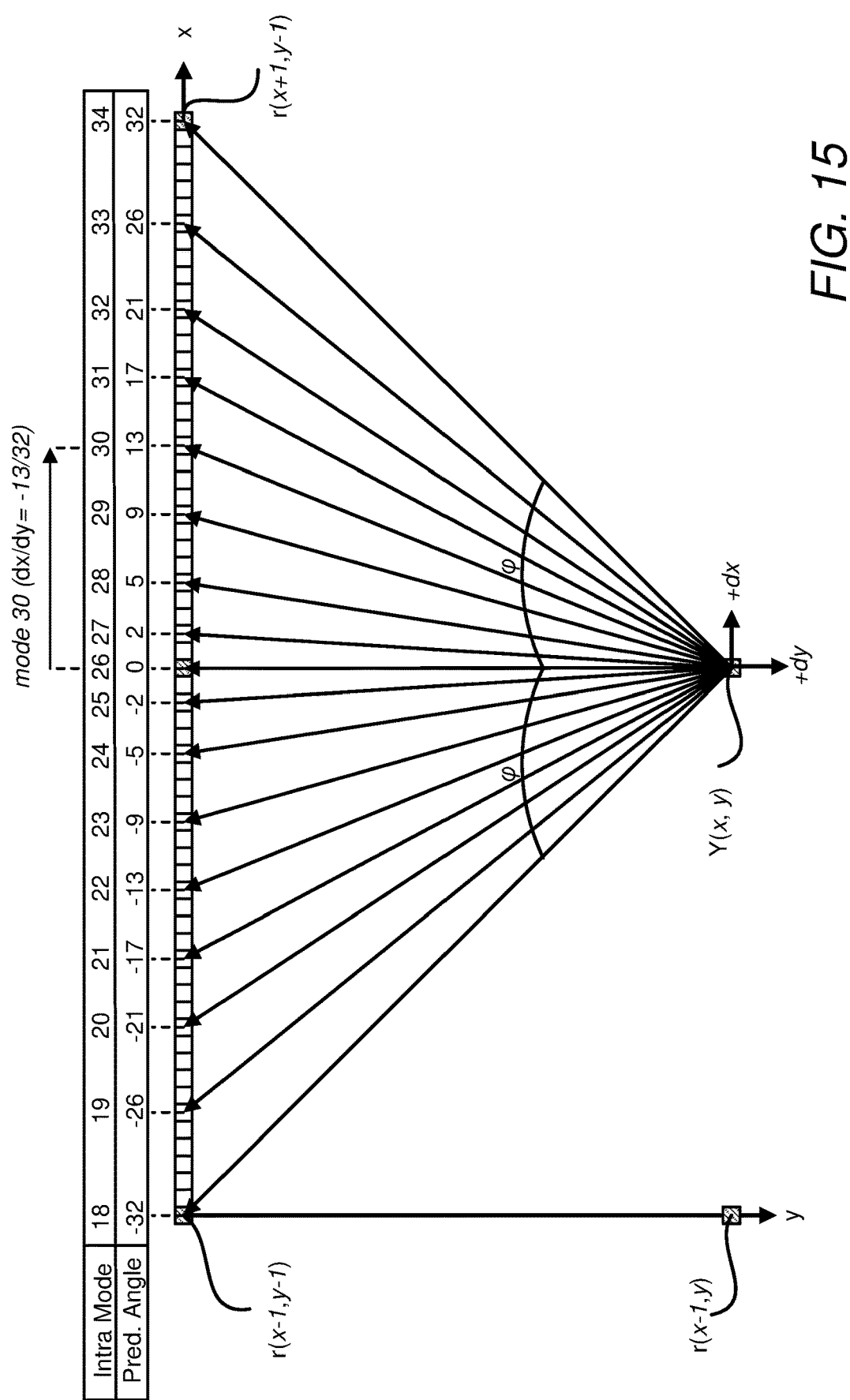
FIG. 15 illustrates an example of vertical angular prediction modes in the HEVC standard.

In HEVC, both vertical and horizontal prediction modes use a level of intra precision of 32. FIG. 15 illustrates the vertical intra prediction modes defined in HEVC. These modes cover an arc of 90 degrees, from −45 degrees to +45 degrees, as is shown in FIG. 15. HEVC maps a prediction mode to a parameter referred to as a prediction angle. The quotient numerator is dx for vertical directions and dy for horizontal directions. FIG. 15 illustrates an example of the intra mode 30, which may be determined by a slope of $-\frac{13}{32}$.

A video coding standard may determine 2p+1 angles of prediction in the vertical direction and 2p+1 angles of predictions in the horizontal direction, where p is the intra precision level. For example, an encoder using a precision level of 32 may determine 65 vertical intra angles, with 32 angles using a positive value for dx in the range of 1 to 32, 32 angles using a negative value for dx in the range of 1 to 32, and a vertical angle determined by dx=0. Similarly, as discussed above for vertical prediction angles, 65 horizontal angles may be defined in an encoder with an intra precision level of 32.

Despite having defined an intra precision of 32, HEVC only determinates a total of 33 angular intra modes (with 17 of the 33 angular intra modes being vertical intra modes, and 16 of the 33 angular intra modes being horizontal intra modes), not allowing the use of many available prediction angles.

Figure 16:
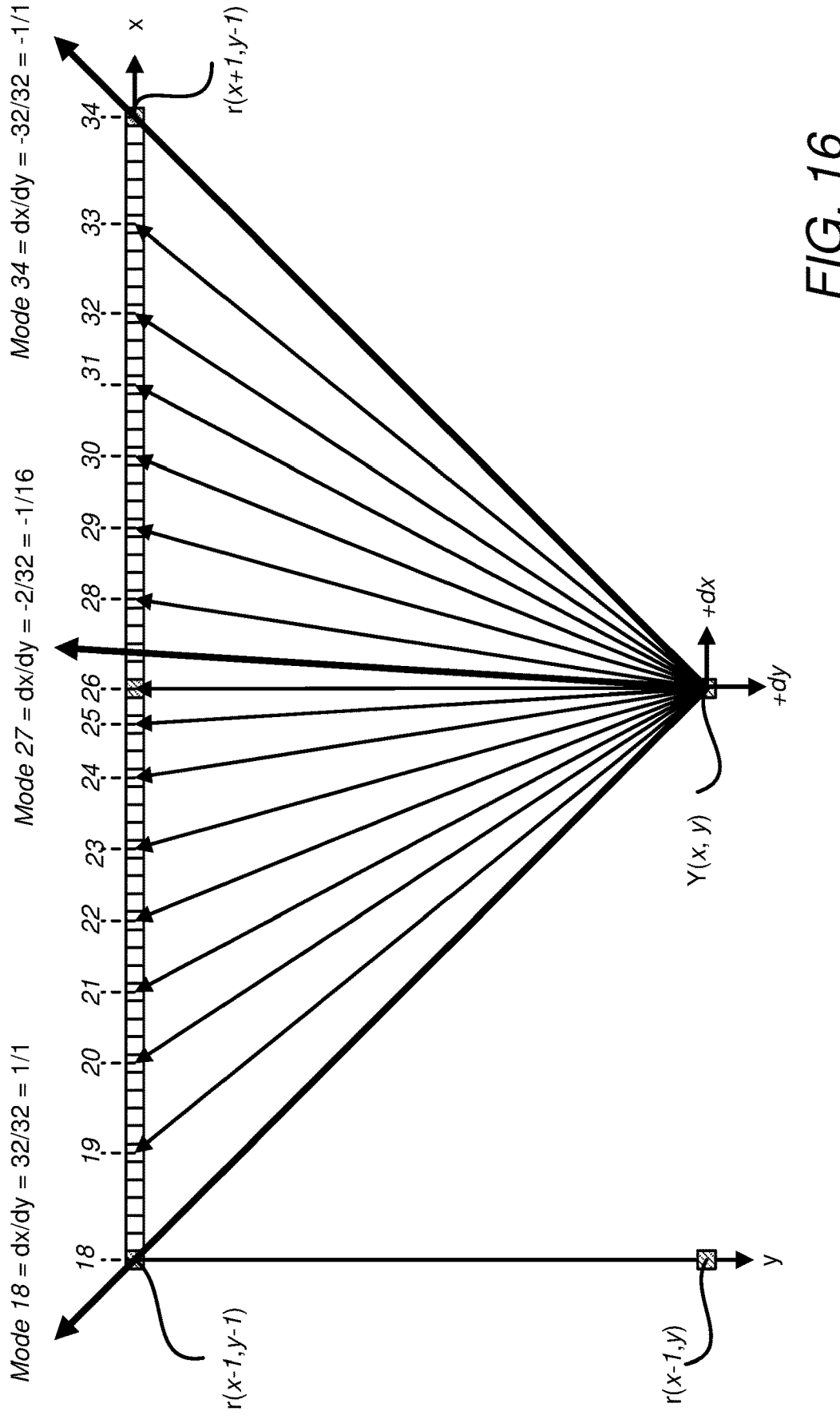
FIG. 16 illustrates an example comparison of some intra prediction modes in the HEVC and their equivalent with the prediction angles using rational slopes in accordance with embodiments of the present disclosure.

FIG. 16 illustrates an example of some vertical modes in HEVC that may be represented with a lower level of intra precision. In particular, modes 18 and 34 may be determined with a precision of 1 and slopes of −1/1 and 1/1, respectively. In a similar way, mode 27 may be represented with an intra precision of 16 instead of 32 and a slope of ¹⁄₁₆.

Figure 17:
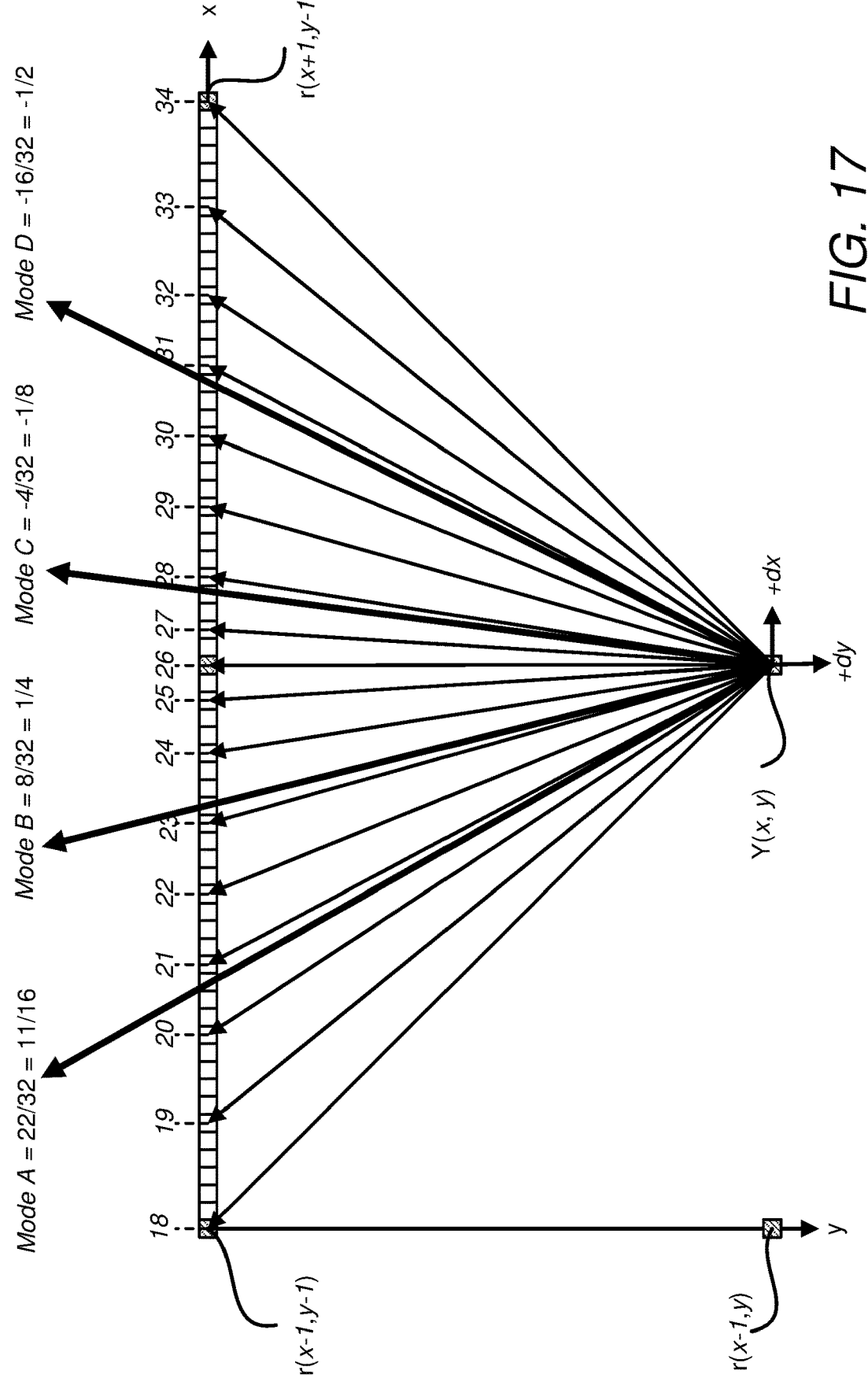
FIG. 17 illustrates an example of some intra prediction modes that cannot be used in the HEVC and their equivalent with the angles using rational slopes in accordance with embodiments of the present disclosure.

FIG. 17 illustrates another example of some non-used intra vertical modes in HEVC, named mode A through mode D, which may be determined with precisions lower than ¹⁄₃₂, ¹⁄₁₆, ⅛, ¼, and ½, respectively. Mode A uses a slope of −¹¹⁄₁₆, mode B uses a slope of −¼, mode C uses a slope of ⅛, and mode D uses a slope of ½. A block with a dominant texture in some of the angles shown in the example of FIG. 17 may achieve a better prediction using those angles of prediction and may generate a residual block that may provide a higher coding gain.

Figure 18:
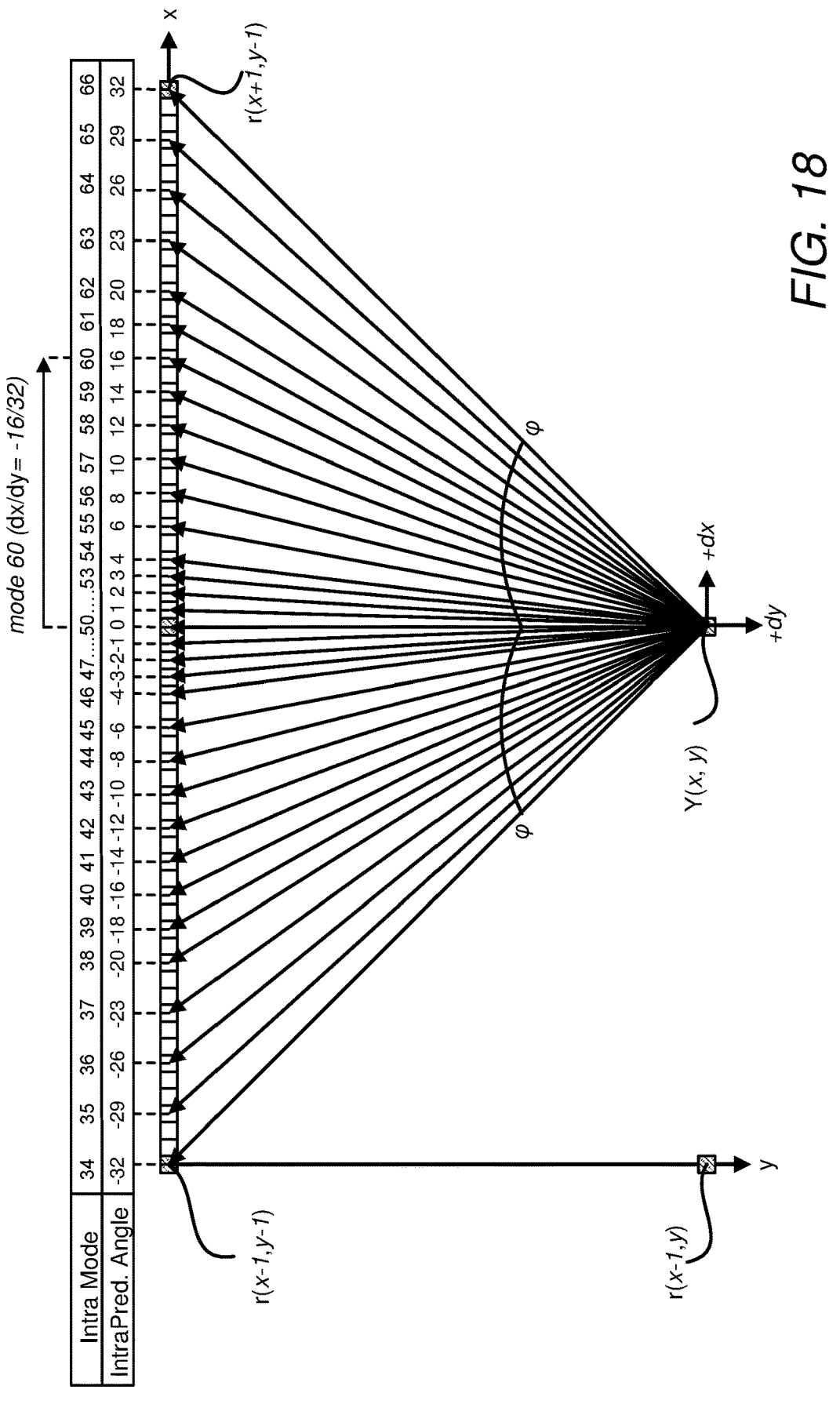
FIG. 18 illustrates an example of vertical angular prediction modes in the VVC standard.

As mentioned above, VVC supports 65 intra angular prediction modes. Despite duplicating the CTU size regarding HEVC, the intra precision in VVC is the same, 32, as its predecessor HEVC. In VVC, a few angles of prediction have been kept from HEVC, and new angles, not used previously in HEVC, have been included. FIG. 18 illustrates the vertical intra prediction modes in VVC, numbered from mode 34 to mode 66. These vertical modes are mapped in VVC to a parameter denoted as IntraPrediction Angle, equivalent to the Prediction Angle parameter in HEVC. Therefore, the IntraPrediction Angle corresponds with the numerator of the slope of the intra prediction angle.

As in HEVC, in VVC, many modes may be represented with a lower intra precision. In VVC, 49 prediction modes are mapped to an intraPredAngle parameter that is an even integer. The fraction representing the slope of those modes may be reduced to its lowest terms, using a lower intra prediction precision. FIG. 18 also illustrates an example of mode 60, which may be represented as a slope of ¹⁶⁄₃₂, and it may also be reduced to a slope of ½ with a precision of 2.

Although the description above was primarily made with respect to intra prediction modes in H.264, HEVC, and VVC, it will be understood that the techniques of the present disclosure described above and further below may be applied to other intra prediction modes, including those of other video coding standards like VP8, VP9, AV1, and the like.

In some video coding standards, like HEVC and VVC, a reduced number of intra prediction angles are allowed among the plurality of prediction angles available for a specific level of intra precision. Each of those angles may be determined as an intra mode, and an encoder may specify an index to each of those intra modes. Encoders may signal the indexes of an intra prediction using a fixed-length binarization (e.g., an unsigned integer 0≤x<M given by its binary representation of the length ⌈log₂ M⌉ bits). In new video coding standards such as VVC, the number of intra modes has increased to 67. Future standards may increase the number of intra modes even further to better predict emerging video formats and to increase the intra prediction precision.

The use of a high number of intra prediction modes may require the largest fixed-length or variable-length binarization, which increases the number of bits used to signal an intra mode to the decoder, compromising the compression gain.

The prediction angles not included in the available intra modes selected in a video coding standard may reduce the coding gain. Some pixel blocks may present a dominant texture in a spatial direction that is not represented by any of the selected intra modes, obtaining a suboptimal prediction and consequently a worst residual block.

Embodiments of the present disclosure are related to a method for signaling a prediction angle (e.g., intra prediction angle) through two components of a line projected in the direction specified by the prediction angle instead of using an index of a prediction mode that maps to a predetermined prediction angle. The two components may determine the slope of the line. The two components may be defined relative to the horizontal and vertical axes, respectively, and may be denoted as dx and dy. An encoder may define a prediction angle using the slope of the line determined by a quotient of dx divided by dy or vice versa.

Figure 19:
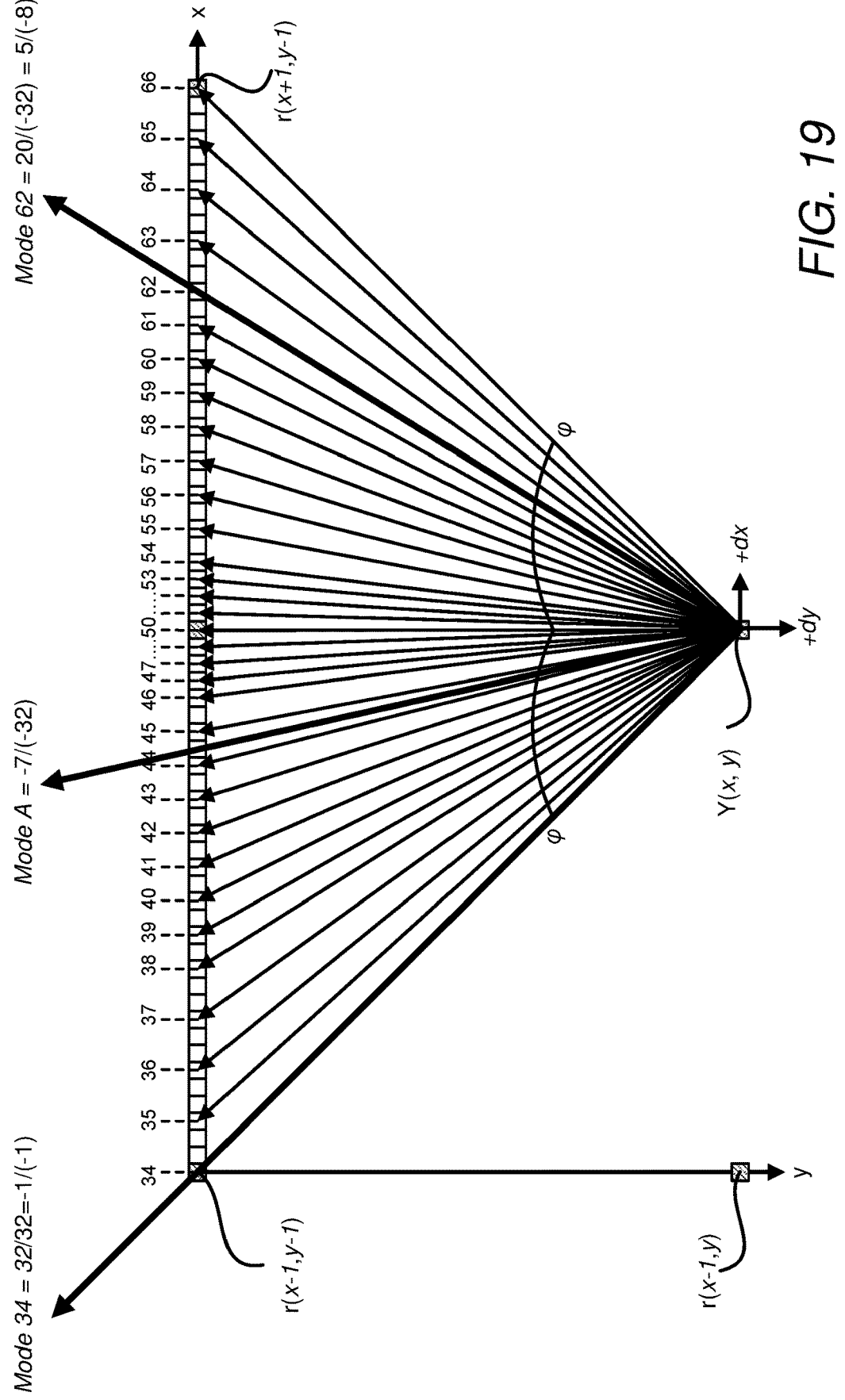
FIG. 19 illustrates an example comparison of some intra prediction modes in VVC and their equivalent with the prediction angles using rational slopes in accordance with embodiments of the present disclosure.

FIG. 19 illustrates an example comparison of some of the intra prediction modes in VVC and their equivalent prediction angles using rational slopes in accordance with embodiments of the present disclosure. FIG. 19 depicts the vertical prediction modes in VVC (modes 34 to 66), a new mode named Mode A, and the intra modes 34 and 62 in VVC, showing the equivalence between the number of mode and their equivalent slope in accordance with embodiments of the present disclosure.

An encoder may signal the intra prediction mode 62 in VVC, which has a slope of 20/(−32) as shown in FIG. 19, by signaling a dx component of 5 and a dy component of −8 (or any dx and dy values with a ratio of 20/(−32)). In a similar way, an encoder may signal a new mode, represented as Mode A in FIG. 19, by signaling a dx component of −7 and a dy component of 32. An encoder may signal the dx and dy components using a signed fixed-length binarization, a variable-length binarization, or an entropy encoded representation of each of the components.

Figure 20:
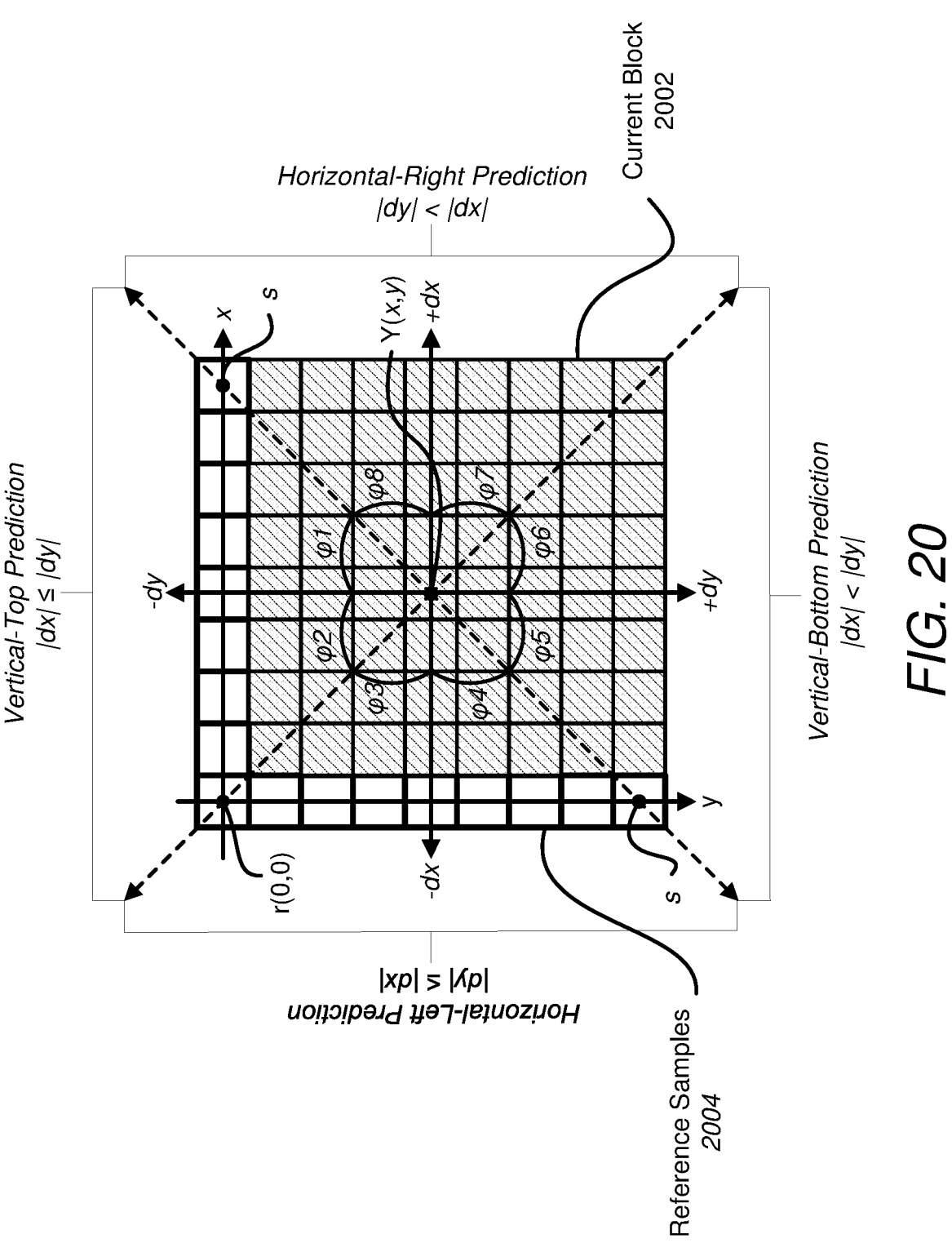
FIG. 20 illustrates an example of prediction angles covering 360 degrees using rational slopes for square blocks in accordance with embodiments of the present disclosure.

FIG. 20 illustrates an example of prediction angles covering 360 degrees using rational slopes for square blocks in accordance with embodiments of the present disclosure. FIG. 20 illustrates a current block of samples 2002 divided into four 90-degree quadrants covering 360 degrees. The four quadrants include a vertical-top prediction quadrant, a vertical-bottom prediction quadrant, a horizontal-left prediction quadrant, and a horizontal-right prediction quadrant. An encoder, such as encoder 200 in FIG. 2, my use an angle in one of the four quadrants as an intra prediction angle to intra predict current block of samples 2002 based on a set of reference samples 2004.

The vertical-top prediction quadrant defines a range of prediction angles φ1 and φ2 relative to the vertical axis. A prediction angle in the range of φ1 and φ2 may be used to predict the current block of samples 2002 based on reference samples 2004. A prediction angle in the range of φ1 and φ2 may be indicated and signaled (e.g., in a bitstream) using a negative value for the dy component and using the component dx a value less or equal than the absolute value of the component dy.

The vertical-bottom prediction quadrant defines a range of prediction angles φ5 and φ6 relative to the vertical axis. A prediction angle in the range of φ5 and φ6 may be used to predict the current block of samples 2002 based on reference samples 2004. A prediction angle in the range of φ5 and φ6 may be indicated and signaled (e.g., in a bitstream) using a positive integer value for the dy component and using the component dx a value less or equal than the absolute value of the component dy.

The horizontal-left prediction quadrant defines a range of prediction angles φ3 and φ4 relative to the horizontal axis. A prediction angle in the range of φ3 and φ4 may be used to predict the current block of samples 2002 based on reference samples 2004. A prediction angle in the range of φ3 and φ4 may be indicated and signaled (e.g., in a bitstream) using a negative integer value for the dx component and using the component dy a value less or equal than the absolute value of the component dx.

The horizontal-right prediction quadrant defines a range of prediction angles φ3 and φ4 relative to the horizontal axis. A prediction angle in the range of φ7 and φ8 may be used to predict the current block of samples 2002 based on reference samples 2004. A prediction angle in the range of φ7 and φ8 may be indicated and signaled (e.g., in a bitstream) using a positive integer value for the dx component and using the component dy a value less or equal than the absolute value of the component dx.

The vertical-bottom prediction quadrant and the horizontal-right prediction quadrant may not be used in current video coding standards for square blocks because the samples of such blocks may not be available to be used as reference samples. However, in the VVC standard, the prediction angles enclosed in these two quadrants may be used as prediction angles for rectangular blocks.

Figure 21:
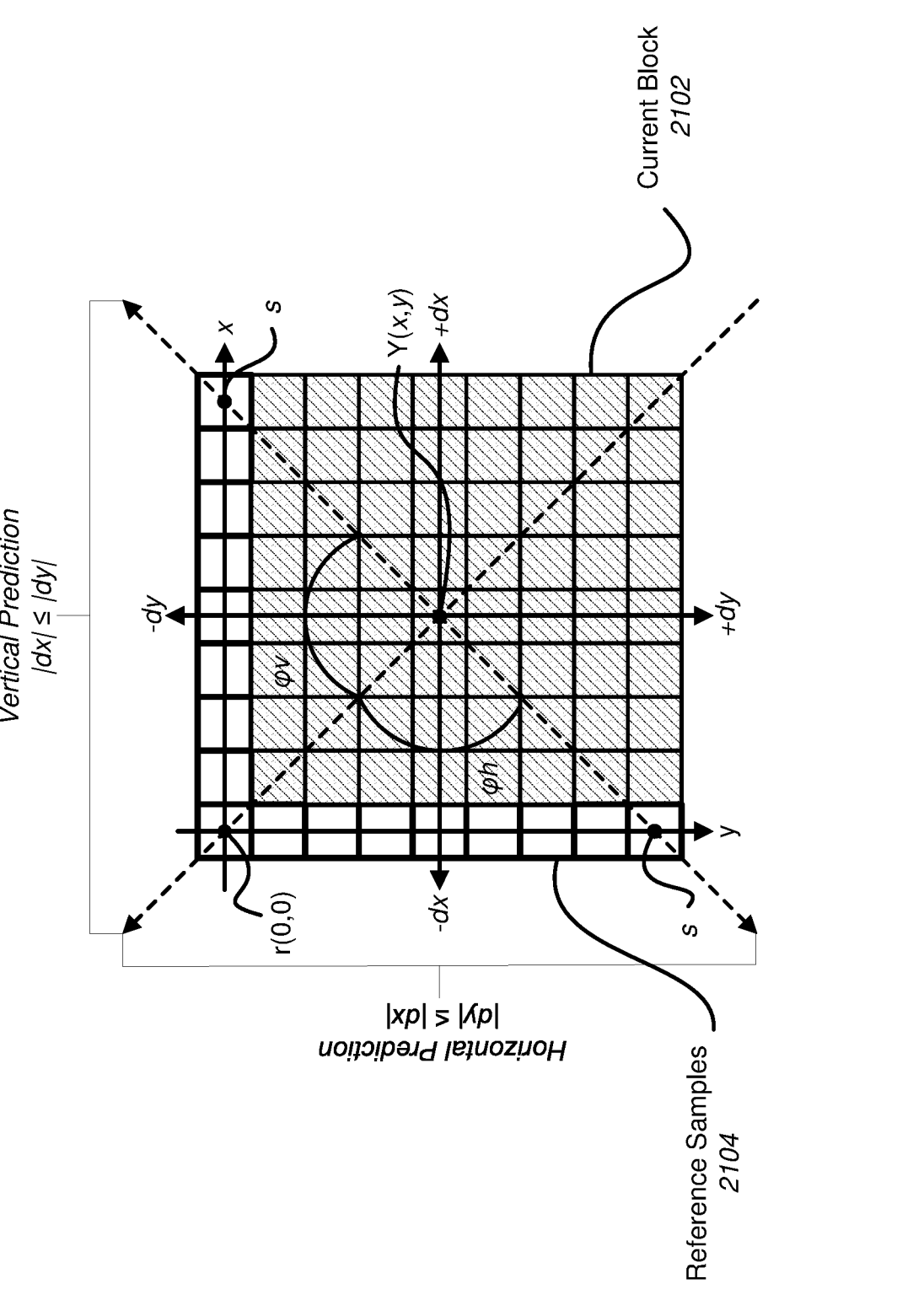
FIG. 21 illustrates an example of vertical and horizontal prediction angles covering 180 degrees using rational slopes for square blocks in accordance with embodiments of the present disclosure.

FIG. 21 illustrates an example of vertical and horizontal prediction angles covering 180 degrees using rational slopes for square blocks in accordance with embodiments of the present disclosure. FIG. 21 illustrates a current block of samples 2102 divided into two 90-degree quadrants covering 180 degrees, comprised by the sum of the angles φ$_v$ and φ$_h$. The two quadrants include a vertical prediction quadrant and a horizontal prediction quadrant, covering a range of prediction angles from 45 degrees to −135 degrees.

Figure 22:
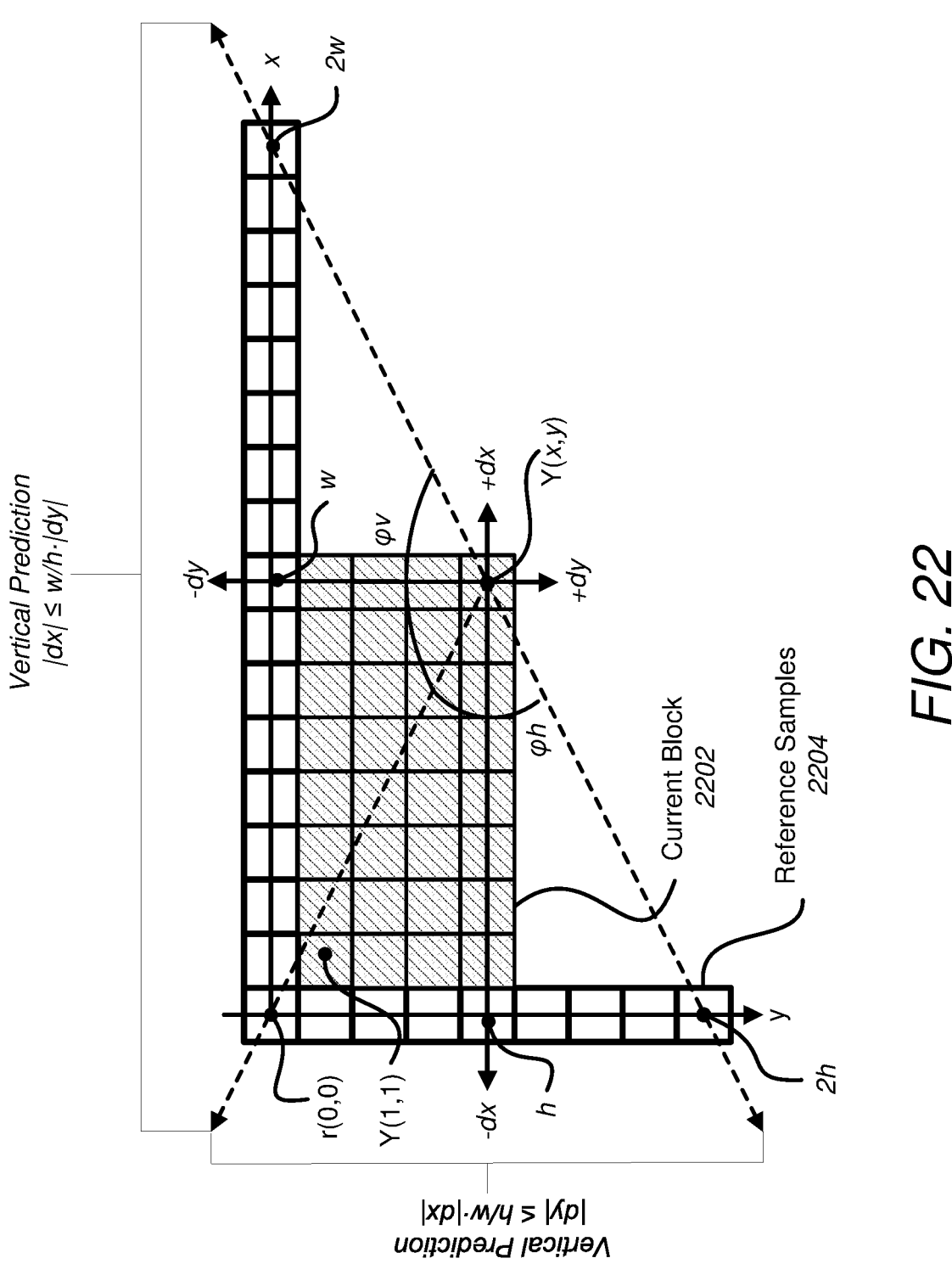
FIG. 22 illustrates an example of vertical and horizontal prediction angles covering 180 degrees using rational slopes for rectangular blocks in accordance with embodiments of the present disclosure.

Embodiments of the present disclosure may determine the angles of prediction for a rectangular block, as is used in VVC and shown in FIG. 22. FIG. 22 illustrates an example comparison of two vertical and two horizontal prediction angles using rational slopes for rectangular blocks in accordance with embodiments of the present disclosure.

FIG. 22 illustrates a rectangular, current block of samples 2202 divided into two quadrants in accordance with embodiments of the present disclosure. The two quadrants include a vertical prediction quadrant and a horizontal prediction quadrant covered by the angles φ$_v$ and φ$_h$. The size of the current block of samples 2202 is w×h samples, denoted the horizontal block size as w, and the vertical block size as h, where w is an integer multiple, k, of h as $$w = k \cdot h; \ \forall k \in \mathbb{Z}, \text{ and } k > 1 \tag{19}$$

The angles range covered for horizontal and vertical prediction directions may be equally 180 degrees, as the intra prediction for square blocks. However, the range of the angles φ$_v$ and φ$_h$, covering each quadrant may be different for rectangular blocks. The vertical prediction angles may cover a range of angles φ$_v$ greater than 90 degrees as $$\varphi_v = 2 \cdot \tan^{-1}\left(\frac{w}{h}\right) \tag{20}$$

In the example of FIG. 22, horizontal prediction angles may cover a range of angles φ$_h$ lower than 90 degrees as $$\varphi_h = 2 \cdot \tan^{-1}\left(\frac{h}{w}\right) \tag{21}$$

Figure 23:
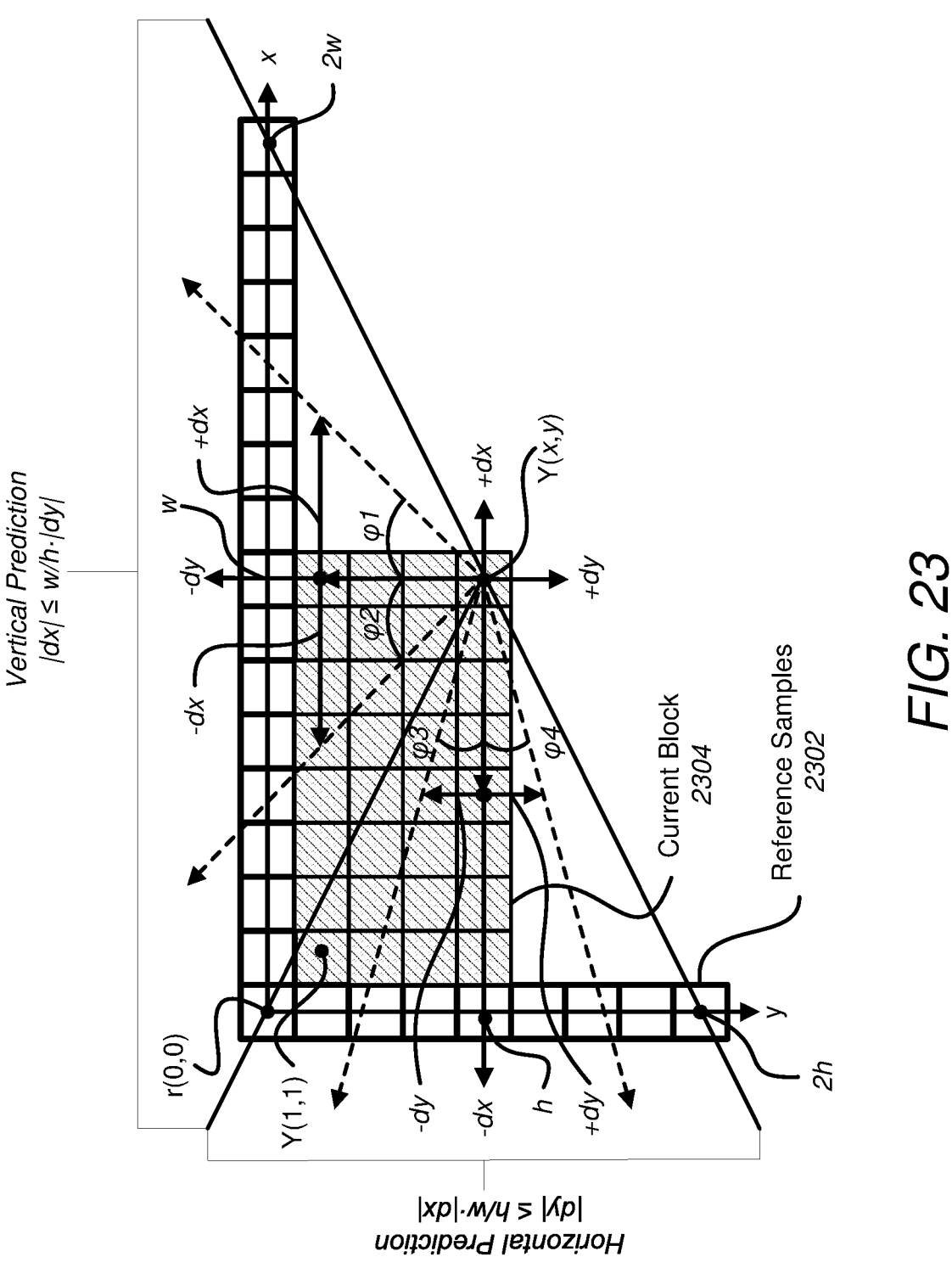
FIG. 23 illustrates an example comparison of two vertical and two horizontal prediction angles using rational slopes for rectangular blocks in accordance with embodiments of the present disclosure.

FIG. 23 illustrates an example comparison of two vertical and two horizontal prediction angles using rational slopes for rectangular blocks in accordance with embodiments of the present disclosure. FIG. 23 illustrates a rectangular, current block of samples 2302 divided into two quadrants, the vertical prediction quadrant and the horizontal prediction quadrant. In this example, vertical prediction modes covering the range of the angles φ1 may be generated using the dy component a negative value and using the component dx a positive integer less or equal than the absolute value of the component dy times $$\frac{w}{h}.$$

vertical prediction modes in the range of the angles φ2 may be generated the dy component using a negative value and using the component dx an integer negative less or equal than the absolute value of the component dy times $$\frac{w}{h}.$$

Regarding the horizontal prediction modes, FIG. 23 illustrates how the horizontal prediction modes covering the range of angles φ3 may be generated using the dx component a negative value and using the component dy an integer negative less or equal than the absolute value of the component dx times $$\frac{h}{w}.$$

Similarly, the horizontal prediction modes in the range of angles φ4 may be generated using a negative value for the dx component and using the component dy an integer positive less or equal absolute value of the component ax times $$\frac{h}{w}.$$

In an embodiment, an encoder may indicate an intra prediction angle for a square or rectangular block in each of the four quadrants to a decoder by sending both components, dx and dy, of a line projected in the direction of the intra prediction angle using a signed fixed-length, variable-length binarization in a bitstream.

An encoder may entropy encode each of the components mentioned above of the line projected in the direction of the intra prediction angle prior to signaling selected intra prediction angle to the decoder. For example, the encoder may apply context-adaptive variable length coding (CAVLC), context adaptive binary arithmetic coding (CAB AC), and/or syntax-based context-based binary arithmetic coding (SBAC).

In another embodiment of the present disclosure, an encoder may determine an intra prediction angle signaling to the decoder the quadrant parameter and the precision parameter of the intra prediction of the intra angle, and the non-precision component.

The precision parameter, denoted as p, may be defined as the absolute value of the component used as the denominator of the slope of a prediction direction, the absolute value of the dy component for the vertical prediction directions, and the absolute value of the dx component for the horizontal prediction directions. The quotient's numerator may be denoted as a non-prediction component of the intra vector.

The quadrant parameter may be signaled using a one-bit flag if the encoder determines the prediction angles in the Horizontal-Left and Vertical-Top quadrants, as shown in FIG. 21, or a 2-bit flag if the encoder determines angles of prediction in the four quadrants, as shown in FIG. 20.

Following the previous example, an encoder may signal the intra prediction mode 62 in VVC, signaling the quadrant parameter as a vertical prediction direction, a precision parameter as p=8, and the dx component as dx=5.

The number of angles that may be determined by using a precision p in each quadrant, for a square block, is $2 \cdot p + 1$, and therefore, the non-precision component may take integer values from −p to p. The number of angles that may be determined by a rectangular block with a width of w and a high of h using a precision p in each quadrant is $$2 \cdot \frac{w}{h} \cdot p + 1,$$

and in this case, the non-precision component may take integer values from $$-\frac{w}{h} \cdot p \text{ to } \frac{w}{h} \cdot p.$$

For instance, a rectangle block with an aspect ratio of $$\frac{w}{h} = 2$$

and a precision parameter of 32, may determine 129 different vertical angles using integer values for the non-precision component, dx, from −64 to 64. In this example, the vertical prediction angles may need to use one bit more for the fixed-length binarization of the dx component compared to the square block. However, as is described below, that increase may be compensated for reducing the fixed-length binarization of the dy component for the horizontal prediction angles.

Similarly, as discussed for the vertical angles for a rectangular block, the number of angles that may be determined for the horizontal directions may be reduced to $$2 \cdot \frac{w}{h} \cdot p + 1.$$

Therefore, the dy component may take integer values from $$-\frac{h}{w} \cdot p \text{ to } \frac{h}{w} \cdot p.$$

Following me same example of a rectangle block with an aspect ratio of $$\frac{w}{h} = 2$$

and a precision parameter of 32, may be determined 33 different horizontal angles using integer values for non-precision component, dy, from −16 to 16. Consequently, the signaling of the non-precision component for the horizontal angles using fixed-length binarization uses one bit less than for square blocks, compensating the excess in a bit required for the signaling of the non-precision component for the vertical angles as it was above described.

It should be noted that the non-precision component may need to represent an odd number of values, which may result in inefficient signaling of the non-precision component. An embodiment of the present disclosure may decide to signal de horizontal (dy=0) and vertical (dx=0) prediction angles as non-angular modes, as the DC and Planar modes in the current standards. It is well known that these prediction angles are statistically more selected for natural images than the rest of the angles, and these may be signaling more efficiently by using fixed-length binarization or variable-length binarization for the non-angular modes (DC, Planar, horizontal, and vertical modes) and the methods described in this embodiment.

An encoder may signal the quadrant parameter, the precision parameter, and the dx component using a signed fixed-length or variable-length binarization. It should be noted that the encoder may entropy encode quadrant parameter, the precision parameter, and the dx component of an intra vector determining an intra prediction angle prior to signaling selected intra prediction angle to the decoder. For example, the encoder may apply context-adaptive variable length coding (CAVLC), context adaptive binary arithmetic coding (CABAC), and/or syntax-based context-based binary arithmetic coding (SBAC).

In another embodiment, an encoder may decide to use a precision parameter power of two exclusively, so it may signal the prediction precision parameter as $\log_2 p$ by using a fixed-length binarization, which may reduce the signaling to $\lceil_2(\log_2 p)\rceil$ bits instead of $\log_2 p$ bits. The encoder may also signal the quadrant parameter and the non-precision component of the prediction angle.

Using a precision parameter power of two allows that slopes with an even value in the numerator may be reduced to equivalent slope using a lower precision parameter, defined by a quotient with an odd numerator. The definition of angles using lower precision may reduce the signaling bits using a fixed-length or variable-length binarization of this parameter. For example, the intra prediction mode 42 in VVC, determined by a slope of $^{12}\!/_{32}$, may be represented by a slope of $\frac{3}{8}$, which has a precision parameter of 8 instead of 32.

The use of angles of prediction determined by a precision parameter power of two also allows the use of odd values for the non-precision component in the range of −p−1 to p−1. Consequently, the available values for the non-precision component may be reduced from $2 \cdot p$ to p, reducing the overhead needed to signal the non-precision component. For example, the non-precision component may be signaled using a fixed-length binarization, saving one bit compared to the angles that are not defined by a precision parameter power of two.

An embodiment of the present disclosure that uses a precision parameter power of two may signal the horizontal (dy=0) and vertical (dx=0) angles of prediction using a precision parameter of zero and signal the slops of ±1/1 using a precision parameter of one for the horizontal and vertical quadrants. A precision parameter of two may be used to signal slopes of ±½, and a precision of 4 for signaling the slopes of ±¼ and ±¾, for the horizontal and vertical quadrants.

The general expression determining the slopes that define a prediction angle for a specific precision parameter power of two is defined as $$S(p) = \left\{ \pm \frac{2 \cdot i - 1}{p} \right\}_{i=1}^{\frac{p}{2}} \forall \ p > 1 \tag{22}$$

For example, as is shown in FIG. 19, the vertical intra mode 34 in VVC, which determines a prediction angle with dx=−32 and a precision of 32, needs 5 signaling bits. Because that angle may be defined by a slope of −1/(−1), in an embodiment of the present disclosure, the intra mode 34 in VVC may be signaled by a one-bit flag indicating the vertical prediction, one bit for the precision parameter (absolute value of dy), and two bits for the signaling the −1 value of the component dx.

In another example based on this embodiment, an encoder may signal a horizontal prediction angle determined by a slope of −7/16 to the decoder using 8 bits. It will use 2 bits fixed-length binarization for the prediction precision $\lceil \log_2 (\log_2 16) \rceil$, one-bit flag for the horizontal direction signaling, and 5 bits for the dy component signaling a fixed-length binarization ($\log_2$ 16+1).

As mentioned above, to increase the coding efficiency, an encoder may entropy encode the quadrant parameter, the logarithmic in base two of the precision parameter, and the non-precision component, determining the slope of a prediction angle prior to signaling it to a decoder. For example, the encoder may apply context-adaptive variable length coding (CAVLC), context adaptive binary arithmetic coding (CABAC), and/or syntax-based context-based binary arithmetic coding (SBAC).

Embodiments of the present disclosure may dynamically determine the precision parameter instead of using a fixed intra precision level, as current standards do.

To reduce the overhead involved with the signaling of the precision parameter for each intra predicted block, an encoder may determine the intra precision at different bit-stream levels. For instance, the intra prediction precision may be determined at the sequence-level, signaling the precision in a syntax element as the Sequence Parameter Set (SPS). In this case, all the intra prediction angles will use the same precision in the stream until a new precision parameter is specified in a new SPS. Consequently, each intra encoded block may signal its intra prediction angle using a one-bit flag to identify a quadrant and the non-precision component (dx or dy), saving the precision parameter signaling bits.

Similarly, the intra precision may also be signaled at frame-level in a syntax element as the Picture Parameter Set (PPS). In this case, all the intra prediction angles in that frame will use the same precision until a new precision parameter is specified in a new PPS or SPS. An encoder may determine the precision at the frame-level, indicating its absolute value or indicate a differential value with the current precision defined in the last SPS or last PPS. Consequently, each intra encoded block may signal its intra prediction angle using a one-bit flag to identify the quadrant parameter and the non-precision component (dx or dy), saving the signaling bits of the precision parameter.

Similarly, the intra precision may be determined at the slice or CTU level by signaling it at the respective slice or CTU headers.

The same approach may be used at the slice-level if an encoder uses this structure. In this case, all the intra prediction angles in that slice will use the same precision until a new precision is specified in a new slice header, a new PPS, or SPS. An encoder may determine the precision at the slice-level, indicating its absolute value or indicate a differential value with the current precision defined in the last slice, last SPS, or last PPS. Consequently, each intra encoded block may signal its intra prediction angle using a one-bit flag to identify the quadrant parameter and the non-precision component (dx or dy), saving the precision parameter's signaling bits.

An encoder may be used at the CTU-level if an encoder uses this structure. In this case, all the intra prediction angles in that CTU will use the same precision until a new precision is specified in a new CTU header, a new slice header, a new PPS, or SPS. An encoder may determine the precision at the CTU-level using its absolute value or indicate a differential value with the current precision defined in the last slice, last SPS, or last PPS. Consequently, each intra encoded block may signal its intra prediction angle using a one-bit flag to identify the vertical or horizontal quadrant and the dx or dy component, saving the precision signaling bits.

FIG. 24 illustrates a flowchart 2400 of a method for signaling an intra prediction angle for a block in accordance with embodiments of the present disclosure. The method of flowchart 2400 may be implemented by an encoder, such as encoder 200 in FIG. 2.

The method of flowchart 2400 begins at 2402. At 2402, reference samples for intra prediction of a block (also referred to as a current block) may be determined. The block may be included within a picture of a video sequence. For constructing the set of reference samples, available samples from neighboring decoded blocks of the current block may be used as discussed above with respect to FIG. 9. Unavailable ones of the reference samples may be filled with available ones of the reference samples. For example, an unavailable reference sample may be filled with a nearest available reference sample determined by moving in a clock-wise direction through the reference samples from the position of the unavailable reference. If no reference samples are available, the reference samples may be filled with the mid-value of the dynamic range of the picture being coded. In other examples, the reference samples may be determined in a different manner.

At 2404, a prediction of the current block may be generated for each of a plurality of intra prediction angles. The plurality of intra prediction angles may comprise, for example, the vertical prediction angle determined by the slope −13/32, which is equivalent to the prediction mode 30 in HEVC, as is shown in FIG. 15. In another example, the plurality of intra prediction angles may comprise, for example, the vertical prediction angle determined by the slope −16/32, which is equivalent to the prediction mode 60 in VVC, as is shown in FIG. 18. In another example, the plurality of intra prediction angles may be determined based on an MPM list constructed for intra prediction of the current block.

At step 2406, an intra prediction angle from the plurality of intra prediction angles may be determined for the current block at 2404. For example, for each of the plurality of intra prediction angles applied at 2404, a prediction error may be determined for the current block based on a difference (e.g., the sum of squared differences (SSD), the sum of absolute differences (SAD), or sum of absolute transformed differences (SATD)) between the prediction samples determined for the intra prediction angles and reconstructed samples of the current block. An intra prediction angle from the plurality of intra prediction angles may be determined based on the prediction errors. For example, an intra prediction angle from the plurality of intra prediction angles may be selected that results in the smallest prediction error. It should be noted that other selection criteria may be used to select an intra prediction angle from the plurality of intra prediction angles.

At step 2408, an intra prediction angle for the current block may be signaled based on a first component and a second component of a line projected in the direction of the intra prediction angle. The first component may be related to the vertical axes, and the second component may be related to the horizontal axes or vice versa. The sign of both components may determine the quadrant of the prediction angle, as shown in FIG. 20. For example, the entropy coding unit 218 may apply context-adaptive variable length coding (CAVLC), context adaptive binary arithmetic coding (CAB AC), and syntax-based context-based binary arithmetic coding (SBAC) to both components. The entropy-coded coefficients may be packed to form a bitstream.

For example, a prediction angle signaled with a first component related to the positive vertical axes and a second component related to the negative horizontal axes may determine a horizontal-left prediction angle depicted by the angle φ4 in FIG. 20.

In another embodiment, the first component may be the denominator of the quotient that determines the slope a line projected in the direction of the prediction angle, which absolute value determinates the prediction precision, and the second component may be the numerator of the quotient that determines the slope of the line projected in the direction of the prediction direction, denoted as a non-prediction component, or vice versa.

An encoder may entropy encode both components applying a context-adaptive variable length coding (CAVLC), context adaptive binary arithmetic coding (CABAC), and/or syntax-based context-based binary arithmetic coding (SBAC).

In other embodiments of the present disclosure, a prediction angle may be signaled by one-bit flag determining the angle quadrant, the precision parameter, and the non-precision component. An encoder using a precision power of two may signal the precision as the exponent of the power of two. An encoder may entropy encode the precision parameter and the non-precision component applying a context-adaptive variable length coding (CAVLC), context adaptive binary arithmetic coding (CAB AC), and/or syntax-based context-based binary arithmetic coding (SBAC).

FIG. 25 illustrates a flowchart 2500 of a method for decoding an intra prediction angle for a block in accordance with embodiments of the present disclosure. The method of flowchart 2500 may be implemented by a decoder, such as a decoder 300 in FIG. 3.

The method of flowchart 2500 begins at 2502. At 2502, a decoder may receive, from a bit stream, a residual block, and signal information related to the intra prediction, which may comprise a first and second component of an intra prediction angle. In other embodiments of the present disclosure, a first component may be generated from a quadrant parameter and the precision parameter received from a bitstream. For example, by receiving a quadrant flag indicating the horizontal prediction and a precision parameter equal to 5, the first component will be equal to −32.

In other embodiments of the present disclosure, a second component may be generated from a quadrant parameter and the precision parameter received from a bitstream. For example, by decoding a quadrant parameter indicating the vertical prediction and a precision parameter equal to 4, the second component will be equal to −16.

At 2504, a prediction angle may be generated from the first and second components obtained at step 2504. Following the previous example, it was decoded a quadrant parameter indicating the horizontal prediction and a precision parameter equal to 5. Receiving a second component equal to 5, the prediction angle may be determined by the slope 5/(−32), which corresponds to intra mode 8 in HEVC. Coming back to the previous example, it was decoded a quadrant parameter indicating the vertical prediction and a precision parameter equal to 4. Receiving a first component equal to 5, the prediction angle may be determined by the slope 5/(−16) equivalent to 10/(−32), which corresponds to intra mode 58 in VVC.

At 2506, reference samples for intra prediction of a block (also referred to as a current block) may be determined. The block may be a picture within a video sequence. For constructing the set of reference samples, available samples from neighboring decoded blocks of the current block may be used as discussed above with respect to FIG. 9. Unavailable ones of the reference samples may be filled with available ones of the reference samples. For example, an unavailable reference sample may be filled with a nearest available reference sample determined by moving in a clock-wise direction through the reference samples from the position of the unavailable reference. If no reference samples are available, the reference samples may be filled with the mid-value of the dynamic range of the picture being coded. In other examples, the reference samples may be determined in a different manner.

At step 2508, an intra prediction block of the current block may be generated from the reference samples based on a prediction angle determined at step 2504.

At step 2510, a decoded block may be generated from the prediction block generated at step 2508 and the residual block.

Figure 26:
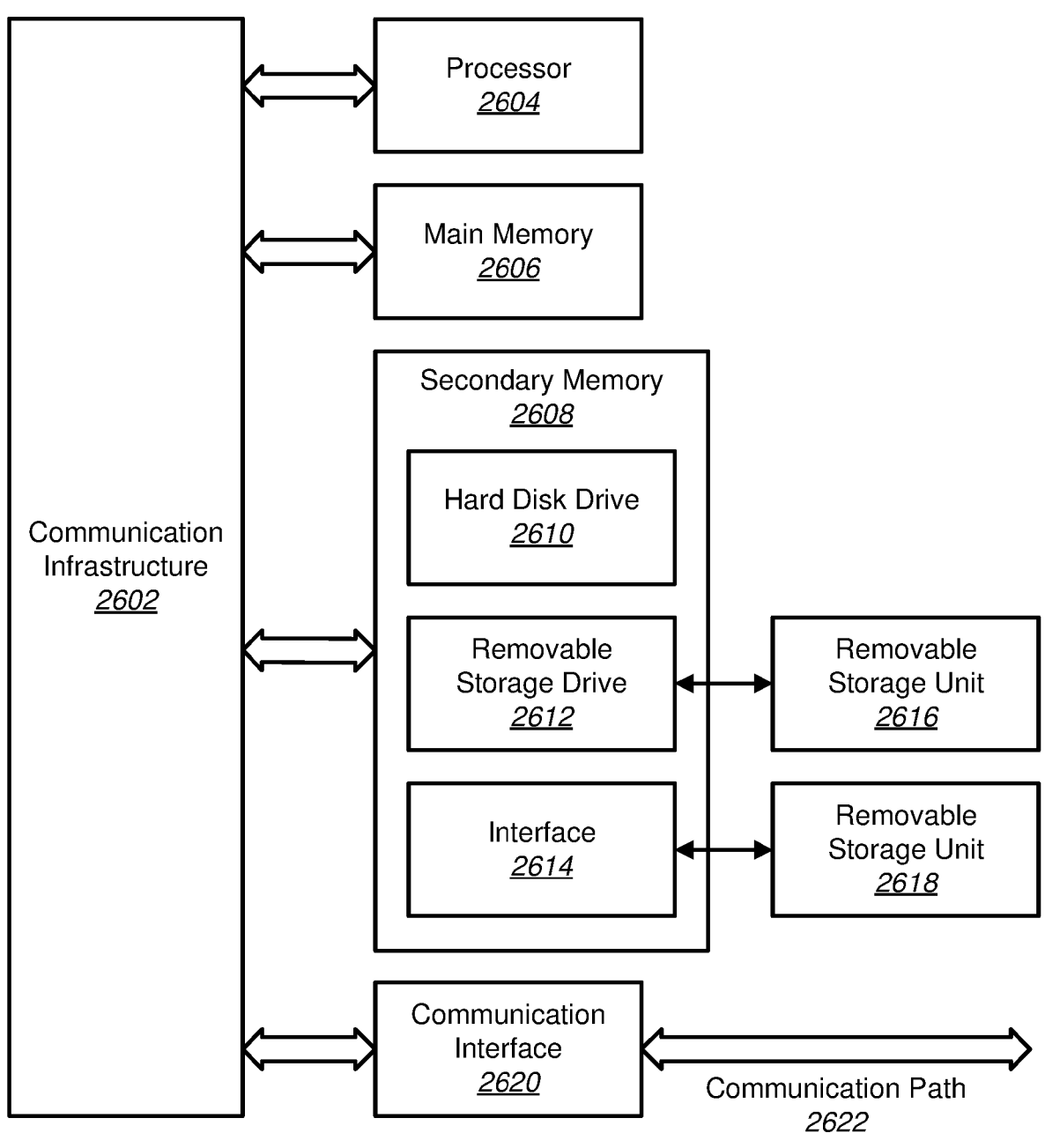
FIG. 26 illustrates a block diagram of an example computer system in which embodiments of the present disclosure may be implemented.

Embodiments of the present disclosure may be implemented in hardware using analog and/or digital circuits, in software, through the execution of instructions by one or more general purpose or special-purpose processors, or as a combination of hardware and software. Consequently, embodiments of the disclosure may be implemented in the environment of a computer system or other processing system. An example of such a computer system 2600 is shown in FIG. 26. Blocks depicted in the figures above, such as the blocks in FIGS. 1, 2, and 3, may execute on one or more computer systems 2600. Furthermore, each of the steps of the flowcharts depicted in this disclosure may be implemented on one or more computer systems 2600.

Computer system 2600 includes one or more processors, such as processor 2604. Processor 2604 may be, for example, a special purpose processor, general purpose processor, microprocessor, or digital signal processor. Processor 2604 may be connected to a communication infrastructure 2602 (for example, a bus or network). Computer system 2600 may also include a main memory 2606, such as random access memory (RAM), and may also include a secondary memory 2608.

Secondary memory 2608 may include, for example, a hard disk drive 2610 and/or a removable storage drive 2612, representing a magnetic tape drive, an optical disk drive, or the like. Removable storage drive 2612 may read from and/or write to a removable storage unit 2616 in a well-known manner. Removable storage unit 2616 represents a magnetic tape, optical disk, or the like, which is read by and written to by removable storage drive 2612. As will be appreciated by persons skilled in the relevant art(s), removable storage unit 2616 includes a computer usable storage medium having stored therein computer software and/or data.

In alternative implementations, secondary memory 2608 may include other similar means for allowing computer programs or other instructions to be loaded into computer system 2600. Such means may include, for example, a removable storage unit 2618 and an interface 2614. Examples of such means may include a program cartridge and cartridge interface (such as that found in video game devices), a removable memory chip (such as an EPROM or PROM) and associated socket, a thumb drive and USB port, and other removable storage units 2618 and interfaces 2614 which allow software and data to be transferred from removable storage unit 2618 to computer system 2600.

Computer system 2600 may also include a communications interface 2620. Communications interface 2620 allows software and data to be transferred between computer system 2600 and external devices. Examples of communications interface 2620 may include a modem, a network interface (such as an Ethernet card), a communications port, etc. Software and data transferred via communications interface 2620 are in the form of signals which may be electronic, electromagnetic, optical, or other signals capable of being received by communications interface 2620. These signals are provided to communications interface 2620 via a communications path 2622. Communications path 2622 carries signals and may be implemented using wire or cable, fiber optics, a phone line, a cellular phone link, an RF link, and other communications channels.

As used herein, the terms "computer program medium" and "computer readable medium" are used to refer to tangible storage media, such as removable storage units 2616 and 2618 or a hard disk installed in hard disk drive 2610. These computer program products are means for providing software to computer system 2600. Computer programs (also called computer control logic) may be stored in main memory 2606 and/or secondary memory 2608. Computer programs may also be received via communications interface 2620. Such computer programs, when executed, enable the computer system 2600 to implement the present disclosure as discussed herein. In particular, the computer programs, when executed, enable processor 2604 to implement the processes of the present disclosure, such as any of the methods described herein. Accordingly, such computer programs represent controllers of the computer system 2600.

In another embodiment, features of the disclosure may be implemented in hardware using, for example, hardware components such as application-specific integrated circuits (ASICs) and gate arrays. Implementation of a hardware state machine to perform the functions described herein will also be apparent to persons skilled in the relevant art(s).

What is claimed is:

1. A method comprising:
   decoding, from a bitstream for intra prediction of a block:
      a first value of a first component of a quotient; and
      a second value of a second component of the quotient;
   receiving, from the bitstream, a residual block of samples for the block;
   determining reference samples for intra prediction of the block;

determining an intra prediction angle based on the quotient, of the first value of the component divided by the second value of the second component, corresponding to a tangent of the intra prediction angle from a plurality of intra prediction angles;
   generating, based on the determined intra prediction angle, a prediction of the block from the reference samples; and
   generating a decoded block from the prediction of the block and the residual block.

2. The method of claim 1, wherein:
   the first value of the first component is along a horizontal axis; and
   the second value of the second component is along a vertical axis.

3. The method of claim 1, wherein the decoding the first and second values of the first and second components further comprises receiving a coding unit syntax comprising:
   a quadrant parameter indicating a range of angles, for the intra prediction angle, corresponding to the plurality of intra prediction angles; and
   a precision parameter indicating a quantity of angles in the range of angles.

4. The method of claim 3, wherein the coding unit syntax further comprise a non-prediction component, and wherein:
   the first value of the first component is determined as a value of the non-prediction component; and
   the second value of the second component is determined based on the precision parameter, wherein the sign of the second component is based on the quadrant parameter.

5. The method of claim 4, wherein the value of the precision parameter is the logarithm in base two of the absolute value of the second value of the second component.

6. The method of claim 1, wherein the intra prediction angle is in a direction of a line having a slope equal to the quotient.

7. The method of claim 3, wherein:
   based on the quadrant parameter indicating the range of angles is in a horizonal direction, the first component is a vertical component and the second component is a horizontal component; or
   based on the quadrant parameter indicating the range of angles is in a vertical direction, the first component is a horizontal component and the second component is a vertical component.

8. The method of claim 3, wherein the quadrant parameter comprises a binary value indicating whether the range of angles is in a horizontal direction or a vertical direction.

9. A decoder comprising:
   one or more processors; and
   memory storing instructions that, when executed by the one or more processors, cause the decoder to:
   decode, from a bitstream for intra prediction of a block:
      a first value of a first component of a quotient; and
      a second value of a second component of the quotient;
   receive, from the bitstream, a residual block of samples for the block;
   determine reference samples for intra prediction of the block;
   determine an intra prediction angle based on the quotient, of the first value of the component divided by the second value of the second component, corresponding to a tangent of the intra prediction angle from a plurality of intra prediction angles;

generate, based on the determined intra prediction angle, a prediction of the block from the reference samples; and generate a decoded block from the prediction of the block and the residual block.

10. The decoder of claim 9, wherein:

the first value of the first component is along a horizontal axis; and the second value of the second component is along a vertical axis.

11. The decoder of claim 9, wherein the decoding the first and second values of the first and second components further comprises receiving a coding unit syntax comprising:

a quadrant parameter indicating a range of angles, for the intra prediction angle, corresponding to the plurality of intra prediction angles; and a precision parameter indicating a quantity of angles in the range of angles.

12. The decoder of claim 11, wherein the coding unit syntax further comprise a non-prediction component, and wherein:

the first value of the first component is determined as a value of the non-prediction component; and the second value of the second component is determined based on the precision parameter, wherein the sign of the second component is based on the quadrant parameter.

13. The decoder of claim 9, wherein the intra prediction angle is in a direction of a line having a slope equal to the quotient.

14. The decoder of claim 11, wherein:

based on the quadrant parameter indicating the range of angles is in a horizonal direction, the first component is a vertical component and the second component is a horizontal component; or based on the quadrant parameter indicating the range of angles is in a vertical direction, the first component is a horizontal component and the second component is a vertical component.

15. The decoder of claim 11, wherein the quadrant parameter comprises a binary value indicating whether the range of angles is in a horizontal direction or a vertical direction.

16. A non-transitory computer-readable medium storing instructions that, when executed by one or more processors of a decoder, cause the decoder to:

decode, from a bitstream for intra prediction of a block:

a first value of a first component of a quotient; and a second value of a second component of the quotient;

receive, from the bitstream, a residual block of samples for the block;

determine reference samples for intra prediction of the block;

determine an intra prediction angle based on the quotient, of the first value of the component divided by the second value of the second component, corresponding to a tangent of the intra prediction angle from a plurality of intra prediction angles;

generate, based on the determined intra prediction angle, a prediction of the block from the reference samples; and generate a decoded block from the prediction of the block and the residual block.

17. The non-transitory computer-readable medium of claim 16, wherein the intra prediction angle is in a direction of a line having a slope equal to the quotient.

18. The non-transitory computer-readable medium of claim 16, wherein the decoding the first and second values of the first and second components further comprises receiving a coding unit syntax comprising:

a quadrant parameter indicating a range of angles, for the intra prediction angle, corresponding to the plurality of intra prediction angles; and a precision parameter indicating a quantity of angles in the range of angles.

19. The non-transitory computer-readable medium of claim 18, wherein the coding unit syntax further comprise a non-prediction component, and wherein:

the first value of the first component is determined as a value of the non-prediction component; and the second value of the second component is determined based on the precision parameter, wherein the sign of the second component is based on the quadrant parameter.

20. The non-transitory computer-readable medium of claim 18, wherein the quadrant parameter comprises a binary value indicating whether the range of angels is in a horizontal direction or a vertical direction.

* * * * *